United States Patent [19]

Van Der Schaaf et al.

[11] Patent Number: 6,093,779
[45] Date of Patent: Jul. 25, 2000

[54] POLYMERIZABLE ACETYLENE COMPOSITION AND ACETYLENE PHOTOPOLYMERIZATION PROCESS

[75] Inventors: Paul Adriaan Van Der Schaaf, Fribourg; Andreas Hafner, Laupen; Andreas Mühlebach, Belfaux, all of Switzerland

[73] Assignee: Ciba Specialty Chemicals Corporation, Tarrytown, N.Y.

[21] Appl. No.: 08/849,572

[22] PCT Filed: Dec. 11, 1995

[86] PCT No.: PCT/EP95/04866

§ 371 Date: Jul. 9, 1997

§ 102(e) Date: Jul. 9, 1997

[87] PCT Pub. No.: WO96/19540

PCT Pub. Date: Jun. 27, 1996

[30] Foreign Application Priority Data

Dec. 21, 1994 [CH] Switzerland .............................. 3852/94

[51] Int. Cl.[7] ...................................................... C08F 38/02
[52] U.S. Cl. .......................... 526/285; 526/161; 526/164; 526/169; 526/170; 526/172; 526/281; 526/283
[58] Field of Search ..................................... 526/170, 172, 526/161, 169, 164, 285, 281, 283

[56] References Cited

U.S. PATENT DOCUMENTS

| | | | |
|---|---|---|---|
| 4,667,006 | 5/1987 | Ai et al. | 526/285 |
| 5,753,721 | 5/1998 | Hafner et al. | 522/53 |
| 5,776,997 | 7/1998 | Hafner et al. | 522/65 |

FOREIGN PATENT DOCUMENTS

| | | |
|---|---|---|
| 0480248 | 4/1992 | European Pat. Off. . |
| 0483722 | 5/1992 | European Pat. Off. . |
| 3542319 | 6/1986 | Germany . |
| 9514051 | 5/1995 | WIPO . |

OTHER PUBLICATIONS

Derwent Abst. 86–187072 (1986).
Masuda et al, Journal Chem. Soc., Chemical Communications, Apr. 1991, pp. 503–504.
Tetrahedron Letters, vol. 34, No. 38, Sep. 1993, pp. 6123–6126.

*Primary Examiner*—David W. Wu
*Assistant Examiner*—Caixia Lu-Rutt
*Attorney, Agent, or Firm*—Luther A. R. Hall

[57] ABSTRACT

Compositions comprising at least one nonvolatile acetylene alone or together with a strained cycloolefin and catalytic amounts of a catalyst for metathesis polymerization, which comprise at least one one-component catalyst from the group molybdenum compounds, tungsten compounds, niobium compounds and tantalum compounds which comprise (a) either at least two methyl groups or two monosubstituted methyl groups without α hydrogen atoms in the substituent or (b) at least one halogen and only one silylmethyl group attached to the metal. The storage-stable compositions can be polymerized by the action of actinic radiation or by short-term irradiation and subsequent thermal curing. The polymers can be used to prepare shaped articles, films, coatings and relief images.

60 Claims, No Drawings

POLYMERIZABLE ACETYLENE COMPOSITION AND ACETYLENE PHOTOPOLYMERIZATION PROCESS

The present invention relates to compositions comprising nonvolatile acetylenes and photocatalytic amounts of a molybdenum, tungsten, niobium or tantalum catalyst which either comprises at least two methyl groups or two monosubstituted methyl groups without α hydrogen atoms in the substituent, or comprises at least one halogen and only one silylmethyl group attached to the metal; to a photopolymerization process for preparing polyacetylenes; to a two-stage process for photopolymerization and subsequent thermal polymerization of nonvolatile acetylenes; to carrier materials having at least one layer comprising nonvolatile acetylenes together with a catalytic amount of this catalyst; and to carrier materials having at least one layer of nonvolatile polyacetylenes or having a relief structure comprising polyacetylenes.

Voronkov et al. [Voronkov, M. G., Pukhnarevich, V. B., Sushchinskaya, S. P., Annenkova, V. Z., Annenkova, V. M., Andreeva, N. J., J. Polymer Science: Polymer Chemistry Edition 18:53–57 (1980)] describe the polymerization of acetylene and substituted acetylenes using molybdenum halides and tungsten halides in 1,2-dichloroethane. Masuda et al. [Masuda, T., Okano, Y., Kuwane, Y., Higashimura, T., Polymer Journal 12:907–913 (1980)] describe the same reaction in other halogenated solvents or in hydrocarbons. The catalysts are so reactive that formation of polymer takes place at room temperature or even at lower temperatures. Consequently, the compositions are difficult to process and, accordingly, have not acquired any importance whatsoever.

Masuda et al. [Masuda, T., Kawasaki, M., Okano, Y., Higashimura, T., Polymer Journal 14:371–377 (1982)] mention that, using cocatalysts such as, for example, tetraphenyltin or triethylaluminum, it is possible to increase the reactivity of molybdenum halides and tungsten halides in the polymerization of acetylenes. A description is also given of how molybdenum hexacarbonyl and tungsten hexacarbonyl, following irradiation with UV light for one hour in the presence of $CCl_4$, form an active catalyst system for the polymerization of acetylenes.

Tamura et al. [Tamura, K., Masuda, T., Higashimura, T., Polymer Bulletin 32:289–296 (1994)] describe how molybdenum hexacarbonyl and tungsten hexacarbonyl together with Lewis acids, following irradiation with UV light, are effective initiators for the polymerization of acetylenes.

Gita and Sundarajan [Gita, B., Sundarajan, G., Tetrahedron Letters 34:6123–6126 (1993)] describe the preparation of block copolymers by metathesis polymerization of norbornene and phenylacetylene using UV-irradiated $W(CO)_6$/$CCl_4$. The preparation of static polymers of norbornene and phenylacetylene was described earlier by Masuda et al. [Masuda, T., Yoshida, T., Makio, H., Rahman, M.Z.A., Higashimura, T., J. Chem. Soc., Chem. Commun. 503–504 (1991)].

Nothing has to date been disclosed in the art regarding the direct photopolymerization of substituted or unsubstituted acetylenes alone or together with strained cycloolefins.

It has now surprisingly been found that nonvolatile acetylenes, alone or together with certain one-component catalysts, constitute compositions which are storage stable if light and moisture are excluded and which, under the action of actinic radiation, are subject to a metathesis polymerization or copolymerization, the polymers being formed in short reaction times and with good to very good yields. It has also been found that it is sufficient, surprisingly, to initiate the polymerization by irradiation and then to continue it under the action of heat, it has also been surprisingly found that the polymerization can be carried out without solvent, a fact which opens up wider possibilities for application, an example being the direct preparation of moldings by bulk polymerization.

One subject of the invention is a composition comprising at least one nonvolatile acetylene alone or together with a stained cycloolefin and catalytic amounts of a catalyst for metathesis polymerization, which comprises at least one one-component catalyst selected from the group consisting of molybdenum compounds, tungsten compounds, niobium compounds and tantalum compounds which comprise (a) either at least two methyl groups or two monosubstituted methyl groups without α hydrogen atoms in the substituent or (b) at least one halogen and only one silylmethyl group attached to the metal.

The cycloolefins involved are, as is known, strained rings. Cyclohexene can in general not be polymerized by olefin metathesis. This exception is known to the skilled worker and is described, for example, in Ivin [Ivin, K. J. in: Ivin, K. J., Saegusa, T. (eds), Ring-Opening Polymerisation 1:139–144 Elsevier Applied Science Publishers, London and New York (1984)].

Suitable acetylenes correspond, for example, to the formula I

$$R_a-C\equiv C-R_b \qquad (I).$$

in which $R_a$ is $C_1-C_{20}$alkyl which is unsubstituted or substituted by halogen, —OH, —CN, —$NH_2C_1-C_6$alkyl, $C_1-C_6$alkyl—O—, $C_1-C_6$alkyl—C(O)NH—, —NH($C_1-C_6$alkyl), —N($C_1-C_6$alkyl)$_2$, $C_1-C_6$alkyl—S—, $C_1-C_6$alkyl—C(O)O—, —C(O)—$NH_2$, $C_1-C_6$alkyl—OC(O)— or $C_1-C_6$alkyl—NHC(O)—, or is $C_3-C_{12}$cycloalkyl, ($C_3-C_{12}$cycloalkyl)—$C_1-C_{12}$alkyl, $C_6-C_{18}$aryl, $C_7-C_{19}$aralkyl, $C_1-C_{20}$alkoxy, $C_3-C_{12}$-cycloalkoxy, ($C_3-C_{12}$cycloalkyl)—$C_1-C_{12}$alkoxy, $C_6-C_{18}$aryloxy, $C_7-C_{19}$aralkyloxy, $C_3-C_9$heterocycloalkyl having 1 to 3 heteroatoms selected from the group consisting of O, N and S, or $C_3-C_{15}$heteroaryl having 1 to 3 heteroatoms selected from the group consisting of O, N and S, or $R_a$ is —(O)$_k$—S $R_cR_dR_e$, $C_1-C_{18}$alkyl—OC(O)—, —C(O)—$NH_2$ or $C_1-C_{18}$alkyl—NHC(O)—;

$R_b$ is hydrogen or, independently, has the meaning of $R_a$;

$R_c$, $R_d$ and $R_e$ independently of one another are $C_1-C_{18}$alkyl, $C_1-C_{18}$alkoxy, $C_5$— or $C_6$cycloalkyl, $C_5$— or $C_6$cycloalkoxy or unsubstituted or $C_1-C_6$alkyl- or $C_1-C_6$alkoxy-substituted phenyl, phenyloxy, benzyl or benzyloxy; and k is 0 or 1.

Preferred substituents of $R_a$ and $R_b$ are —OH, —F, —Cl, —CN, $C_1-C_4$alkyl and $C_1-C_4$alkoxy, for example methyl, ethyl, n- or i-propyl and n-, i- or t-butyl.

$R_a$ and $R_b$ as alkyl contain preferably 1 to 12 and particularly preferably 1 to 8 C atoms, $R_a$ and $R_b$ being, in a preferred embodiment, independently of one another, branched alkyl. Examples are methyl, ethyl, isopropyl, n-propyl, n-butyl, isobutyl, sec-butyl, tert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

$R_a$ and $R_b$ as cycloalkyl are preferably $C_5-C_8$cycloalkyl, especially $C_5$— or $C_6$cycloalkyl. Some examples are cyclopropyl, dimethylcyclopropyl, cyclobutyl, cyclopentyl, methylcyclopentyl, cyclohexyl, cycloheptyl and cyclooctyl.

$R_a$ and $R_b$ as cycloalkyl-alkyl are preferably $C_5$–$C_8$cycloalkyl—$CH_2$—, $C_5$–$C_8$cycloalkyl—$CH(CH_3)$— or $C_5$–$C_8$cycloalkyl—$C(CH_3)_2$—, especially $C_5$— or $C_6$cycloalkyl—$CH_2$. Some examples are cyclopropyl—$CH_2$—, dimethylcyclopropyl-$CH_2$—, cyclohexyl—$CH_2$—, cyclopentyl—$CH_2$—, cyclopentyl—$C(CH_3)_2$—, methylcyclopentyl—$CH_2$—, cyclohexyl—$CH_2$—, cyclohexyl—$CH(CH_3)$—, cyclohexyl-$C(CH_3)_2$—, cycloheptyl—$CH_2$— and cyclooctyl—$CH_2$—.

$R_a$ and $R_b$ as aryl contain preferably 6 to 14 and particularly preferably 6 to 10 C atoms. They may, for example, be phenyl, methylphenyl, dimethylphenyl, trimethylphenyl, chlorophenyl, fluorophenyl, methoxyphenyl and dimethoxyphenyl, pentaline, indene, naphthalene, azuline or anthracene. Unsubstituted or substituted phenyl is particularly preferred.

$R_a$ and $R_b$ as aralkyl contain preferably 7 to 12 C atoms and particularly preferably 7 to 10 C atoms. They may, for example, be benzyl, phenethyl, 3-phenylpropyl, α-methylbenzyl, phenbutyl and α,α-dimethylbenzyl. Unsubstituted or substituted benzyl is particularly preferred, for example benzyl, methylbenzyl, dimethylbenzyl, trimethylbenzyl, α-methylbenzyl and α,α-dimethylbenzyl.

$R_a$ and $R_b$ as heterocycloalkyl contain preferably 4 or 5 C atoms and one or two heteroatoms selected from the group consisting of O, S and N. They can, for example, be oxirane, azirine, 1,2-oxathiolane, pyrazoline, pyrroldine, piperidine, piperazine, morpholine, tetrahydrofuran or tetrahydrothiophene, from which $R_a$ and $R_b$ are derived as monovalent radicals. The heterocycloalkyl contain preferably 4 or 5 C atoms and one or two heteroatoms selected from the group consisting of O, S and N. They can, for example, be oxirane, azirine, 1,2-oxathiolane, pyrazoline, pyrrolidine, piperidine, piperazine, morpholine, tetrahydrofuran or tetrahydrothiophene, from which $R_a$ and $R_b$ are derived as monovalent radicals. The heterocycloalkyl is preferably attached via one of its C atoms to the acetylene radical.

$R_a$ and $R_b$ as heteroaryl contain preferably 4 or 5 C atoms and one or two heteroatoms selected from the group consisting of O, S and N. They may, for example, be pyrrole, furan, thiophene, oxazole, thiazole, pyridine, pyrazine, pyrimidine, pyridazine, indole, purine and quinoline, from which $R_a$ and $R_b$ are derived as monovalent radicals. The heteroaryl is preferably attached by one of its C atoms to the acetylene radical.

If $R_a$ and $R_b$ are alkoxy, cycloalkoxy, (cycloaklyl)alkoxy, aryloxy or aralkyloxy, the hydrocarbon groups in the oxy radicals are subject to the same preferred embodiments as indicated beforehand for alkyl, cycloalkyl, cycloalkyl-alkyl, aryl and aralkyl.

Where $R_c$, $R_d$ and $R_e$ are alkyl or alkoxy, it can be linear or branched and can preferably contain 1 to 12, particularly preferably 1 to 8 and especially 1 to 4 C atoms. Particularly preferred alkyl is methyl and ethyl. Particular preference as alkoxy is given to methoxy and ethoxy.

Preferred substituents for $R_c$, $R_d$ and $R_e$ as phenyl, phenyloxy, benzyl and benzyloxy are, within the context of the definitions, methyl, ethyl, methoxy and ethoxy.

In one preferred embodiment $R_c$, $R_d$ and $R_e$ are $C_1$–$C_4$alkyl, $C_1$–$C_4$alkoxy, phenyl or benzyl.

In the formula —$(O)_k$—$SiR_cR_dR_e$, k is preferably 0.

Some examples of the group $R_a$ of the formula —$(O)_k$—$SiR_cR_dR_e$ are —$Si(CH_3)_3$, —$Si(OCH_3)_3$, —$Si(C_6H_5)_3$, —$Si(C_2H_5)_3$, —$Si(n-C_3H_7)_3$, —$Si(n-C_4H_9)_3$, —$Si(CH_3)_2(n-C_4H_9)$, —$Si(CH_3)_2(t-C_4H_9)$, —$Si(CH_3)_2(C_2H_5)$, —$Si(CH_3)_2[C(CH_3)_2CH(CH_3)_2]$, —$Si(OC_6H_5)_3$, —$Si(CH_3)_2(n-C_{12}H_{25})$, —$Si(CH_3)_2(n-C_{18}H_{37})$, —$Si(CH_2$—$C_6H_5)_3$, —$Si(C_6H_5)(CH_3)_2$, —$Si(CH_2$—$C_6H_5)(CH_3)_2$ and —$Si(OCH_2$—$C_6H_5)_3$. Very particular preference is given to —$Si(CH_3)_3$.

In a particularly preferred embodiment, at least one of the groups $R_a$ and $R_b$ is a sterically bulky group, for example cyclic radicals and, in particular, secondary or tertiary alkyl radicals.

Some examples of actylenes of the formula I are $CH_3$—C≡CH, $CH_3$—C≡C—$CH_3$, $C_2H_5$—C≡CH, n- or i-$C_3H_7$—C≡CH, n-, i- or t-$C_4H_9$—C≡CH, t-$C_4H_9$—C≡$CH_3$, $C_4H_9$—C≡C—$C_4H_9$—$C_6H_{11}$—C≡CH, $C_6H_5$—C≡CH, $C_6H_5$C≡C$C_6H_5$, HC≡C—$Si(CH_3)_3$, $(H_3C)_3Si$—C≡C—$Si(CH_3)_3$, $CH_3$—C≡C—$Si(CH_3)_3$, t-$C_4H_9O$—C≡CH and HC≡C—$Si(OCH_3)_3$.

Very particularly preferred acetylenes are t-butylacetylene, trimethylsilylacetylene and methyl-trimethylsilylacetylene.

The acetylenes of the formula I are known or can be prepared by known processes.

The acetylenes of the formula I can be subjected to a photometathesis polymerization, alone or together with strained cycloolefins as comonomers.

The novel composition may therefore additionally comprise nonvolatile strained cycloolefins as comonomers. In this way it is possible to specifically modify the properties of the polymers. The amount of comonomers can, for example, be from 0.1 to 99% by weight, preferably from 1 to 95% by weight, more preferably from 5 to 90% by weight, with particular preference from 5 to 75% by weight and, with especial preference, from 5 to 60% by weight, based on the overall amount of the monomers.

The cyclic olefins can be monocyclic or polycyclic fused and/or bridged ring systems and/or ring systems connected directly or via a bridge group, which have for example from two to four rings and which are unsubstituted or substituted and can contain heteroatoms such as, for example, O, S, N or Si in one or more rings and/or can contain fused aromatic or heteroaromatic rings, for example o-phenylene, o-naphthylene, o-pyridinylene or o-pyrimidinylene. The individual cyclic rings may include 3 to 16, preferably 3 to 12 and, with particular preference, 3 to 8 ring members. The cyclic and polycyclic olefins may include further nonaromatic double bonds, preferably from 2 to 4 such additional double bonds depending on ring size. The ring substituents involved are those which are inert; in other words, those which do not impair the chemical and thermal stability of the niobium, tantalum, molybdenum and tungsten compounds. The cycloolefins are strained ring or ring systems.

Thermal stability means in the context of the invention that the photocatalytically active niobium(V), tantalum(V), molybdenum(VI) or tungsten(VI) compounds do not when heated form active specifies for the metathesis polymerization. The catalyst is unable, for example, to initiate metathesis polymerization at room temperature to slightly elevated temperature, such as about +40° C., for a period of weeks with exclusion of light. During this time, only an insignificant amount of monomer (less than 0.2% by weight) is converted. The thermal stability can be determined, for example, by storing a toluene solution containing 20% by weight monomer and 0.33% by weight molybdenum, tungsten, niobium or tantalum catalyst for 96 hours in darkness at 50° C. and the amount of polymer possibly formed, evident from the increase in viscosity and measurable by precipitation in a precipitant, for example ethanol, filtration and drying, is not more than 0.5% by weight and preferably not more than 0.2% by weight.

If the cyclic olefins contain more than one double bond, for example 2 to 4 double bonds, then depending on the reaction conditions, on the chosen monomer and on the amount of catalyst it is also possible for crosslinked polymers to form.

In a preferred embodiment the cycloolefins correspond to the formula II

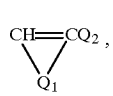

(II)

in which $Q_1$ is a radical which has at least one carbon atom and which, together with the —CH=CQ$_2$— group, forms an at least 3-membered alicyclic ring containing, if desired, one or more heteroatoms selected from the group consisting of silicon, phosphorous, oxygen, nitrogen and sulfur; which is unsubstituted or is substituted by halogen, =O, —CN, —NO$_2$, $R_1R_2R_3Si$—(O)$_u$—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, $C_1$–$C_{20}$alkyl, $C_1$–$C_{20}$hydroxyalkyl $C_1$–$C_{20}$haloalkyl, $C_1$–$C_6$cyanoalkyl, $C_3$–$C_8$cycloalkyl, $C_6$–$C_{16}$aryl, $C_7$–$C_{16}$aralkyl, $C_3$–$C_6$heterocycloalkyl, $C_3$–$C_{16}$heteroaryl, $C_4$–$C_{16}$heteroaralkyl or $R_4$—X—; or in which two adjacent C atoms are substituted by —CO—O—CO— or —CO—NR$_5$—CO—; or in which, if desired, an alicyclic, aromatic or heteroaromatic ring is fused onto adjacent carbon atoms of the alicyclic ring and is unsubstituted or substituted by halogen, —CN, —NO$_2$, $R_6R_7R_8Si$—(O)$_u$—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, $C_1$–$C_{20}$alkyl, $C_1$–$C_{20}$haloalkyl, $C_1$–$C_{20}$hydroxyalkyl, $C_1$–$C_6$cyanoalkyl, $C_3$–$C_8$cycloalkyl, $C_6$–$C_{16}$aryl, $C_7$–$C_{16}$aralkyl, $C_3$–$C_6$heterocycloalkyl, $C_3$–$C_{16}$heteroaryl, $C_4$–$C_{16}$heteroaralkyl or $R_{13}$—X$_1$—;

X and $X_1$ independently of one another are —O—, —S—, —CO—, —SO—, —SO$_2$—, —O—C(O)—, —C(O)—O—, —C(O)—NR$_5$—, —NR$_{10}$—C(O)—, —SO$_2$—O— or —O—SO$_2$—;

$R_1$, $R_2$ and $R_3$ independently of one another are $C_1$–$C_{12}$alkyl, $C_1$–$C_{12}$perfluoroalkyl, phenyl or benzyl;

$R_4$ and $R_{13}$ independently are $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl, or $C_7$–$C_{16}$aralkyl;

$R_5$ and $R_{10}$ independently of one another are hydrogen, $C_1$–$C_{12}$alkyl, phenyl or benzyl, the alkyl groups in turn being unsubstituted or substituted by $C_1$–$C_{12}$alkoxy or $C_3$–$C_8$cycloalkyl;

$R_6$, $R_7$ and $R_8$ independently of one another are $C_1$–$C_{12}$alkyl, $C_1$–$C_{12}$perfluoroalkyl, phenyl or benzyl;

M is an alkali metal and $M_1$ is an alkaline earth metal; and u is 0 or 1;

where the alicyclic ring formed with $Q_1$ may contain further nonaromatic double bonds;

$Q_2$ is hydrogen, $C_1$–$C_{20}$alkyl, $C_1$–$C_{20}$haloalkyl, $C_1$–$C_{12}$alkoxy, halogen, —CN, $R_{11}$—X$_2$—;

$R_{11}$ is $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl or $C_7$–$C_{16}$aralkyl;

$X_2$ is —C(O)—O— or —C(O)—NR$_{12}$—;

$R_{12}$ is hydrogen, $C_1$–$C_{12}$alkyl, phenyl or benzyl;

where the above-mentioned cycloalkyl, heterocycloalkyl, aryl, heteroaryl, aralkyl and heteroaralkyl groups are unsubstituted or substituted by $C_1$–$C_{12}$alkyl, $C_1$–$C_{12}$alkoxy, —NO$_2$, —CN or halogen, and where the heteroatoms of the above-mentioned heterocycloalkyl, heteroaryl and heteroaralkyl groups are selected from the group consisting of —O—, —S—, —NR$_9$— and —N=; and $R_9$ is hydrogen, $C_1$–$C_{12}$alkyl, phenyl or benzyl.

Fused-on alicyclic rings contain preferably 3 to 8, particularly preferably 4 to 7 and, with particular preference, 5 or 6 ring C atoms.

In the definitions of the substituents the alkyl, alkenyl and alkynyl groups can be straight-chain or branched. The same also applies to the alkyl moiety of alkoxy, alkylthio, alkoxycarbonyl and other alkyl-containing groups. These alkyl groups contain preferably 1 to 12, more preferably 1 to 8 and, with particular preference, 1 to 4 C atoms. These alkenyl and alkynyl groups contain preferably 2 to 12, more preferably 2 to 8 and, with particular preference, 2 to 4 C atoms.

Alkyl comprises, for example, methyl, ethyl, isopropyl, n-propyl, n-butyl, iso-butyl, sec-butyl, tert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Hydroxyalkyl comprises, for example, hydroxymethyl, hydroxyethyl, 1-hydroxyisopropyl, 1-hydroxy-n-propyl, 2-hydroxy-n-butyl, 1-hydroxy-isobutyl, 1-hydroxy-sec-butyl, 1-hydroxy-tert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Haloalkyl comprises, for example, fluoromethyl, difluoromethyl, trifluoromethyl, chloromethyl, dichloromethyl, trichloromethyl, 2,2,2-trifluoroethyl, 2-fluoroethyl, 2-chloroethyl, 2,2,2-trichloroethyl and also halogenated alkanes, especially fluorinated or chlorinated alkanes, for example of the isopropyl, n-propyl, n-butyl, iosbutyl, sec-butyl, tert-butyl, and of the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl radicals.

Alkenyl comprises, for example, propenyl, isopropenyl, 2-butenyl, 3-butenyl, isobutenyl, n-penta-2,4-dienyl, 3-methyl-but-2-enyl, n-oct-2-enyl, n-dodec-2-enyl, iso-dodecenyl, n-octadec-2-enyl, n-octadec-4-enyl.

Cycloalkyl is preferably $C_5$–$C_8$cycloalkyl, especially $C_5$- or $C_6$cycloalky. Some examples are cyclopropyl, dimethylcyclopropyl, cyclobutyl, cyclopentyl, methylcyclopentyl, cyclohexyl, cycloheptyl and cyclooctyl.

Cyanoalkyl comprises, for example, cyanomethyl (methylnitrile), cyanoethyl (ethylnitrile), 1-cyanoisopropyl, 1-cyano-n-propyl, 2-cyano-n-butyl, 1-cyano-iso-butyl, 1-cyano-sec-butyl, 1-cyano-tert-butyl and the various isomeric cyanopentyl and -hexyl radicals.

Aralkyl contains preferably 7 to 12 C atoms and particularly preferably 7 to 10 C atoms. It can, for example, be benzyl, phenethyl, 3-phenylpropyl, α-methylbenzyl, phenbutyl or α,α-dimethylbenzyl.

Aryl contains preferably 6 to 10 atoms. It can, for example, be phenyl, pentaline, indene, naphthalene, azuline or anthracene.

Heteroaryl contains preferably 4 of 5 atoms and one or two heteroatoms selected from the group consisting of O, S and N. It can, for example, be pyrrole, furan, thiophene, oxazole, thiazole, pyridine, pyrazine, pyrimidine, pyridazine, indole, purine or quinoline.

Heterocycloalkyl contains preferably 4 or 5 C atoms and one or two heteroatoms selected from the group consisting of O, S and N. It can, for example, be oxirane, azirine, 1,2-oxathiolane, pyrazoline, pyrrolidine, piperidine, piperazine, morpholine, tetrahydrofuran or tetrahydrothiophene.

Alkoxy is, for example, methoxy, ethoxy, propyloxy, i-propyloxy, n-butyloxy, i-butyloxy, sec-butyloxy and t-butyloxy.

For the purposes of the present invention, alkali metal is lithium, sodium, potassium, rubidium and cesium, especially lithium, sodium and potassium.

For the purposes of the present invention, alkaline earth metal is beryllium, magnesium, calcium, strontium and barium, especially magnesium and calcium.

In the above definitions halogen (halo) refers to fluorine, chlorine, bromine and iodine preferably fluorine, chlorine and bromine.

Particularly suitable compounds of the formula II are those in which $Q_2$ is hydrogen.

Preference is also given to compounds of the formula II in which the alicyclic ring formed by $Q_1$ together with the —CH=$CQ_2$— group has 3 to 16, more preferably 3 to 12 and, with particular preference, 3 to 8 ring atoms and where the ring system involved can be a monocyclic, bicyclic, tricyclic or tetracyclic ring system.

With particular advantage the novel composition comprises compounds of the formula II in which $Q_1$ is a radical having at least one carbon atom which together with the —CH=$CQ_2$— group forms a 3- to 20-membered alicyclic ring which may contain one or more heteroatoms selected from the group consisting of silicon, oxygen, nitrogen and sulfur, and which is unsubstituted or substituted by halogen, =O, —CN, —$NO_2$, $R_1R_2R_3$—Si—(O)$_u$—, —COOM, —$SO_3$M, —$PO_3$M, —COOM($M_1$)$_{1/2}$, —$SO_3$($M_1$)$_{1/2}$, —$PO_3$($M_1$)$_{1/2}$, $C_1$–$C_{12}$alkyl, $C_1$–$C_{12}$haloalkyl, $C_1$–$C_{12}$hydroxyalkyl, $C_1$–$C_4$cyanoalkyl, $C_3$–$C_6$cycloalkyl, $C_6$–$C_{12}$aryl, $C_7$–$C_{12}$aralkyl, $C_3$–$C_6$heterocycloalkyl, $C_3$–$C_{12}$heteroaryl, $C_4$–$C_{12}$heteroaralkyl or $R_4$—X—; or in which two adjacent C atoms in this radical $Q_1$ are substituted by —CO—O—CO— or —CO—$NR_5$—CO—; or in which an alicyclic, aromatic or heteroaromatic ring may be fused onto adjacent carbon atoms and is unsubstituted or substituted by halogen, —CN, —$NO_2$, $R_6R_7R_8$Si—, —COOM, —$SO_3$M, —$PO_3$M, —COO($M_1$)$_{1/2}$, —$SO_3$($M_1$)$_{1/2}$, —$PO_3$($M_{11/2}$, $C_1$–$C_{12}$alkyl, $C_1$–$C_{12}$haloalkyl, $C_1$–$C_{12}$hydroxyalkyl, $C_1$–$C_4$cyanoalkyl, $C_3$–$C_6$cycloalkyl, $C_6$–$C_{12}$aryl, $C_7$–$C_{12}$aralkyl, $C_3$–$C_6$heterocycloalkyl, $C_3$–$C_{12}$heteroaryl, $C_4$–$C_{12}$heteroaralkyl or $R_{13}$—$X_1$—;

X and $X_1$ independently of one another are —O—, —S—, —CO—, —SO—, —$SO_2$—, —O—C(O)—, —C(O)—O—, —C(O)—$NR_5$—, —$NR_{10}$—C(O)—, —$SO_2$—O— or —O—$SO_2$—;

$R_1$, $R_2$ and $R_3$ independently of one another are $C_1$–$C_6$alkyl, $C_1$–$C_6$perfluoroalkyl, phenyl or benzyl;

M is an alkali metal and $M_1$ is an alkaline earth metal;

$R_4$ and $R_{13}$ independently of one another are $C_1$–$C_{12}$alkyl, $C_1$–$C_{12}$haloalkyl, $C_1$–$C_{12}$hydroxyalkyl, $C_3$–$C_8$cycloalkyl, $C_6$–$C_{12}$aryl, $C_7$–$C_{12}$aralkyl;

$R_5$ and $R_{10}$ independently of one another are hydrogen, $C_1$–$C_6$alkyl, phenyl or benzyl, the alkyl groups in turn being unsubstituted or substituted by $C_1$–$C_6$alkoxy or $C_3$–$C_6$cycloalkyl;

$R_6$, $R_7$ and $R_8$ independently of one another are $C_1$–$C_6$alkyl, $C_1$–$C_6$perfluoroalkyl, phenyl or benzyl;

u is 0 or 1;

where the alicyclic ring formed with $Q_1$ may contain further nonaromatic double bonds;

$Q_2$ is hydrogen, $C_1$–$C_{12}$alkyl, $C_1$–$C_{12}$haloalkyl, $C_1$–$C_6$alkoxy, halogen, —CN, $R_{11}$—$X_2$—;

$R_{11}$ is $C_1$–$C_{12}$alkyl, $C_1$–$C_{12}$haloalkyl, $C_1$–$C_{12}$hydroxyalkyl, $C_3$–$C_6$cycloalkyl, $C_6$–$C_{12}$aryl or $C_7$–$C_{12}$aralkyl;

$X_2$ is —C(O)—O— or —C(O)—$NR_{12}$—; and $R_{12}$ is hydrogen, $C_1$–$C_6$alkyl, phenyl or benzyl;

where the cycloalkyl, heterocycloalkyl, aryl, heteroaryl, aralkyl and heteroaralkyl groups are unsubstituted or substituted by $C_1$–$C_6$alkyl, $C_1$–$C_6$alkoxy, —$NO_2$, —CN or halogen, and where the heteroatoms of the heterocycloalkyl, heteroaryl and heteroaralkyl groups are selected from the group consisting of —O—, —S—, —$NR_9$— and —N=; and $R_9$ is hydrogen, $C_1$–$C_6$alkyl, phenyl or benzyl.

From this group, preference is given to those compounds of the formula II in which $Q_1$ is a radical having at least one carbon atom which together with the —CH=$CQ_2$— group forms a 3- to 10-membered alicyclic ring which may contain a heteroatom selected from the group consisting of silicon, oxygen, nitrogen and sulfur and which is unsubstituted or substituted by halogen, —CN, —$NO_2$, $R_1R_2R_3$Si—, —COOM, —$SO_3$M, —$PO_3$M, —COO($M_1$)$_{1/2}$, —$SO_3$($M_1$)$_{1/2}$, —$PO_3$($M_1$)$_{1/2}$, $C_1$–$C_6$alkyl, $C_1$–$C_6$haloalkyl, $C_1$–$C_6$hydroxyalkyl, $C_1$–$C_4$cyanoalkyl, $C_3$–$C_6$cycloalkyl, phenyl, benzyl or $R_4$—X—; or in which an alicyclic, aromatic or heteroaromatic ring may be fused onto adjacent carbon atoms and is unsubstituted or substituted by halogen, —CN, —$NO_2$, $R_6R_7R_8$Si—, —COOM, —$SO_3$M, —$PO_3$M, —COO($M_1$)$_{1/2}$, —$SO_3$($M_1$)$_{1/2}$, —$PO_3$($M_1$)$_{1/2}$, $C_1$–$C_6$alkyl, $C_1$–$C_6$haloalkyl, $C_1$–$C_6$hydroxyalkyl, $C_1$–$C_4$cyanoalkyl, $C_3$–$C_6$cycloalkyl, phenyl, benzyl or $R_{13}$—$X_1$—;

$R_1$, $R_2$ and $R_3$ independently of one another are $C_1$–$C_4$alkyl, $C_1$–$C_4$perfluoroalkyl, phenyl or benzyl;

M is an alkali metal and $M_1$ is an alkaline earth metal;

$R_4$ and $R_{13}$ independently of one another are $C_1$–$C_6$alkyl, $C_1$–$C_6$haloalkyl, $C_1$–$C_6$hydroxyalkyl or $C_3$–$C_6$cycloalkyl;

X and $X_1$ independently of one another are —O—, —S—, —CO—, —SO— or —$SO_2$—;

$R_6$, $R_7$ and $R_8$ independently of one another are $C_1$–$C_4$alkyl, $C_1$–$C_4$perfluoroalkyl, phenyl or benzyl;

and $Q_2$ is hydrogen.

The novel process is particularly suitable for polymerizing norbornene and norbornene derivatives. Of these norbornene derivatives, particular preference is given to those which correspond alternatively to the formula III

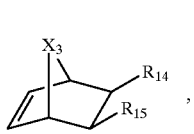

(III)

in which $X_3$ is —$CHR_{16}$—, oxygen or sulfur;

$R_{14}$ and $R_{15}$ independently of one another are hydrogen, —CN, trifluoromethyl, $(CH_3)_3Si$—O—, $(CH_3)_3Si$— or —$COOR_{17}$; and $R_{16}$ and $R_{17}$ independently of one another are hydrogen, $C_1$–$C_{12}$alkyl, phenyl or benzyl;

or to the formula IV

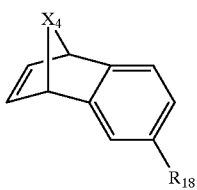
(IV)

in which
  $X_4$ is —$CHR_{19}$—, oxygen or sulfur;
  $R_{19}$ is hydrogen, $C_1$–$C_{12}$alkyl, phenyl or benzyl; and
  $R_{18}$ is hydrogen, $C$–$C_6$alkyl or halogen;
or to the formula V

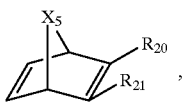
(V)

in which
  $X_5$ is —$CHR_{22}$—, oxygen or sulfur; $R_{22}$ is hydrogen, $C_1$–$C_{12}$alkyl, phenyl or benzyl;
  $R_{20}$ and $R_{21}$ independently of one another are hydrogen, CN, trifluoromethyl, $(CH_3)_3Si$—O—, $(CH_3)_3Si$— or —$COOR_{23}$; and
  $R_{23}$ is hydrogen, $C_1$–$C_{12}$alkyl, phenyl or benzyl;
or to the formula VI,

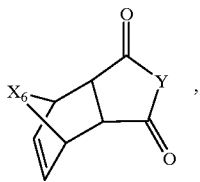
(VI)

in which
  $X_6$ is —$CHR_{24}$—, oxygen or sulfur;
  $R_{24}$ is hydrogen, $C_1$–$C_{12}$alkyl, phenyl or benzyl;
  Y is oxygen or

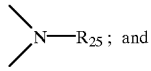
; and $R_{25}$ is hydrogen, methyl, ethyl or phenyl.

The following compounds are particularly suitable for the novel polymerization process, bicyclic and polycyclic systems being obtainable by Diels-Alder reactions:

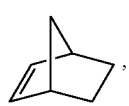
(1)

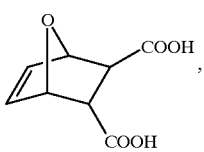
(2)

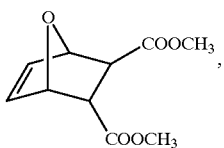
(3)

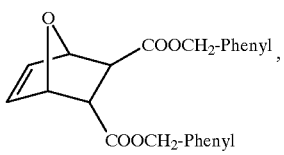
(4)

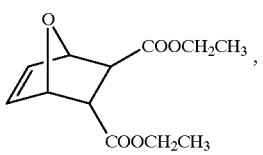
(5)

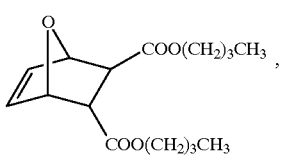
(6)

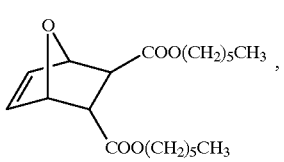
(7)

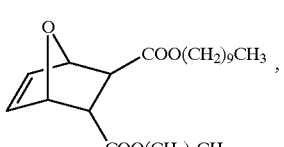
(8)

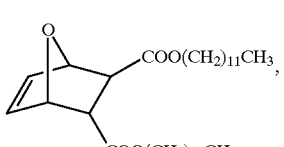
(9)

(10) (11)

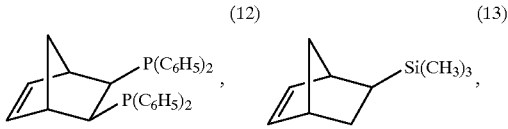
(12) (13)

-continued
(14) 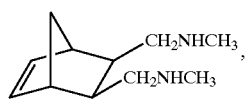 (15) 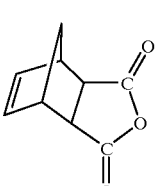
(16) 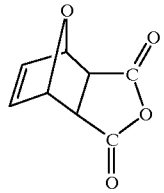 (17) 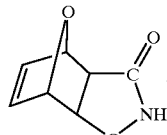
(18) 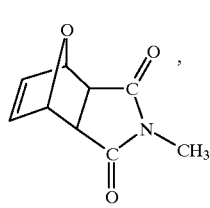 (19) 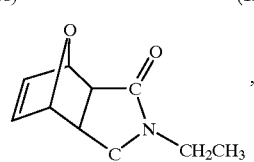
(20)  (21) 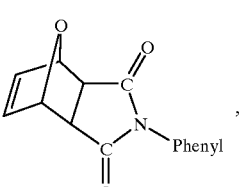
(22) 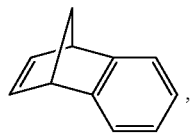 (23) 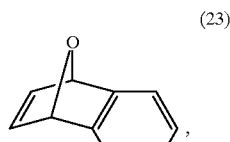
(24) 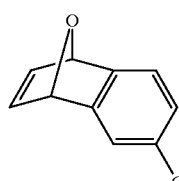 (25) 
(26) 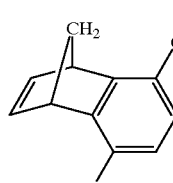 (27) 
(28) 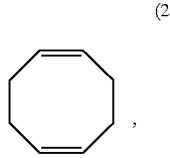 (29) 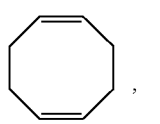 (30) 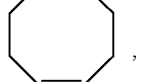
-continued
(31)  (32) (33) 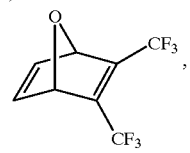
(34) 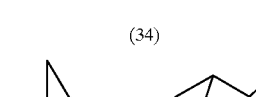 (35)
(36) 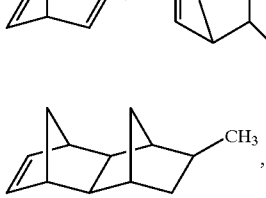
(37) 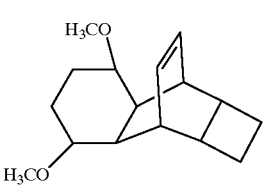
(38) 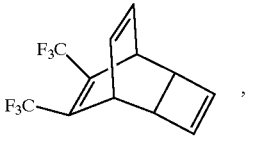
(39) 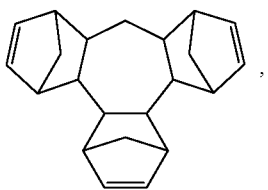
(40) 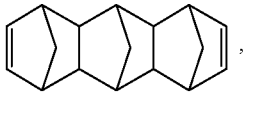
(41) 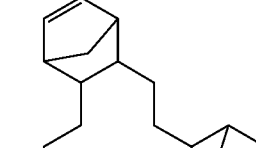

-continued (42)

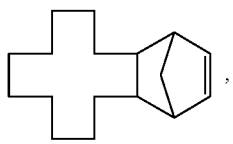

(43)

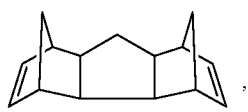

(44)

(45)

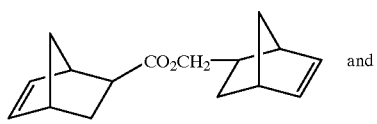 and (46)

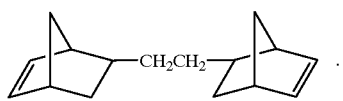

In a preferred embodiment the novel composition comprises, as comonomers, strained cycloolefins composed only of carbon and hydrogen.

Very particularly preferred comonomers are selected from the group consisting of norbornene, cyclopentene, cycloheptene and cyclooctene.

The niobium(V) and tantalum(V) compounds to be used in accordance with the invention contain one metal atom. In the case of the molybdenum(VI) and tungsten(VI) compounds to be used in accordance with the invention, the compounds involved may include one metal atom or two metal atoms connected via a single, double or triple bond.

If a methyl group or a monosubstituted methyl group without α hydrogen atoms in the substituent is attached to the metal, then it is attached at least twice, particularly preferably from two to five times, with especial preference, two or three times as ligand. The group attached to the metal atom preferably corresponds to the formula VII

—CH$_2$—R (VII), in which R is H, —CF$_3$, —CR$_{26}$R$_{27}$R$_{28}$, —SiR$_{29}$R$_{30}$R$_{31}$, unsubstituted or C$_1$–C$_6$alkyl— or C$_1$–C$_6$alkoxy-substituted C$_6$–C$_{16}$aryl or C$_4$–C$_{15}$heteroaryl having 1 to 3 heteroatoms selected from the group consisting of O, S and N; and R$_{26}$, R$_{27}$ and R$_{28}$ independently of one another are C$_1$–C$_{10}$alkyl which is unsubstituted or substituted by C$_1$–C$_{10}$alkoxy, or R$_{26}$ and R$_{27}$ have this meaning and R$_{28}$ is C$_6$–C$_{10}$aryl or C$_4$–C$_9$heteroaryl which is unsubstituted or substituted by C$_1$–C$_6$alkyl or C$_1$–C$_6$alkoxy; and R$_{29}$, R$_{30}$ and R$_{31}$ independently of one another are C$_1$–C$_{18}$alkyl, C$_5$- or C$_6$cycloalkyl, or unsubstituted or C$_1$–C$_6$alkyl- or C$_1$–C$_6$alkoxy-substituted phenyl or benzyl.

If R$_{26}$ to R$_{31}$ are alkyl it can be linear or branched and can preferably contain 1 to 8 and, with particular preference, 1 to 4 C atoms. If R$_{28}$ to R$_{31}$ are aryl then the radical involved is preferably phenyl or naphthyl.

If R in formula VII is aryl it is preferably phenyl or naphthyl.

If R in formula VII is heteroaryl it is preferably pyridinyl, furanyl, thiophenyl or pyrrolyl.

Preferred substituents for R$_{26}$ to R$_{31}$ in the context of the definitions are methyl, ethyl, methoxy and ethoxy. Examples of the radicals R$_{26}$ to R$_{31}$ have been indicated above under the compounds of the formula I.

In a preferred embodiment the group R in formula VII is H, —C(CH$_3$)$_3$, —C(CH$_3$)$_2$C$_6$H$_5$, phenyl which is unsubstituted or is substituted by methyl, ethyl, methoxy or ethoxy, or is —CF$_3$ or —Si(CH$_3$)$_3$.

If at least one halogen and one silylmethyl group are attached to the metal atom, the silylmethyl group preferably corresponds to the formula VIIa —CH$_2$—SiR$_{29}$R$_{30}$R$_{31}$ (VIIa), in which R$_{29}$, R$_{30}$ and R$_{31}$ independently of one another are C$_1$–C$_{18}$alkyl, C$_5$- or C$_6$cycloalkyl, or are unsubstituted or C$_1$–C$_6$alkyl- or C$_1$–C$_6$alkoxy-substituted phenyl or benzyl. The halogen in this case is preferably Cl or Br.

If R$_{29}$ to R$_{31}$ are alkyl it can be linear or branched and can preferably contain 1 to 12, particularly preferably 1 to 8 and especially 1 to 4 C atoms. Methyl and ethyl are particularly preferred as alkyl.

Preferred substituents for R$_{29}$ to R$_{31}$ as phenyl and benzyl in the context of the definitions are methyl, ethyl, methoxy and ethoxy.

In a preferred embodiment, in the group of the formula VIIa R$_{29}$ to R$_{31}$ are C$_1$–C$_4$alkyl, phenyl or benzyl.

Some examples of the group of the formula VIIa are —CH$_2$—Si(CH$_3$)$_3$, —CH$_2$-Si(C$_2$H$_5$)$_3$, —CH$_2$—Si(n—C$_3$H$_7$)$_3$, —CH$_2$—Si(n—C$_4$H$_9$)$_3$, —CH$_2$—Si(CH$_3$)$_2$(n—C$_4$H$_9$), —CH$_2$-Si(CH$_3$)$_2$(t—C$_4$H$_9$), —CH$_2$—Si(CH$_3$)$_2$(C$_2$H$_5$), —CH$_2$—Si(CH$_3$)$_2$[C(CH$_3$)$_3$], —CH$_2$—Si(CH$_3$)$_2$(n—C$_{12}$H$_{25}$), —CH$_2$—Si(CH$_3$)$_2$(n—C$_{18}$H$_{37}$), —CH$_2$—Si(C$_6$H$_5$)$_3$, —CH$_2$-Si(CH$_2$-C$_6$H$_5$)$_3$, —CH$_2$—Si(C$_6$H$_5$)(CH$_3$)$_2$ and —CH$_2$—Si(CH$_2$—C$_6$H$_5$)(CH$_3$)$_2$. Very particular preference is given to —CH$_2$—Si(CH$_3$)$_3$.

The remaining valences of the molybdenum, tungsten, niobium and tantalum are preferably satisfied by thermally stable neutral ligands, the number of which may exceed the stoichiometrically possible number (solvates). Advantageously they are identical or different ligands selected from the group consisting of =O and =N—R$_{33}$, secondary amines having 2 to 18 C atoms, R$_{32}$O—, R$_{32}$S—, halogen, substituted or unsubstituted cyclopentadienyl, bridged biscyclopentadienyl, tridentate monoanionic ligands and neutral ligands, for example ethers, nitriles, CO and tertiary phosphines and amines, in which the R$_{32}$s independently of one another are unsubstituted or C$_1$–C$_6$alkoxy- or halo-substituted linear or branched C$_1$–C$_{18}$alkyl, unsubstituted or C$_1$–C$_6$alkyl-, C$_1$–C$_6$alkoxy- or halo-substituted C$_5$- or C$_6$cycloalkyl, unsubstituted or C$_1$–C$_6$alkyl-, C$_1$–C$_6$alkoxy-, C$_1$–C$_6$alkoxymethyl-, C$_1$–C$_6$alkoxyethyl- or halo-substituted phenyl, or unsubstituted or C$_1$–C$_6$alkyl-, C$_1$–C$_6$alkoxy-, C$_1$–C$_6$alkoxymethyl-, C$_1$–C$_6$alkoxyethyl- or halo-substituted benzyl or phenylethyl; and R$_{33}$ is unsubstituted or C$_1$–C$_6$alkoxy-substituted linear or branched C$_1$–C$_{18}$alkyl, unsubstituted or C$_1$–C$_6$alkyl-, C$_1$–C$_6$alkoxy- or halo-substituted C$_5$- or C$_6$cycloalkyl, phenyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl, or halogen, or is unsubstituted or $C_1$–$C_6$alkyl-, $C_1$–$C_6$alkoxy-, $C_1$–$C_6$alkoxymethyl-, $C_1$–$C_6$alkoxyethyl- or halo-substituted benzyl or phenylethyl.

Secondary amines are preferably those of the formula $R_{34}R_{35}N$—, in which $R_{34}$ and $R_{35}$ independently of one another are linear or branched $C_1$–$C_{18}$alkyl, $C_5$- or $C_6$cycloalkyl, unsubstituted or $C_1$–$C_6$alkoxy- or halo-substituted benzyl or phenylethyl or ($C_1$–$C_6$alkyl)$_3$Si; or together are tetramethylene, pentamethylene or 3-oxapentane-1,5-diyl. The alkyl contains preferably 1 to 12 and particularly preferably 1 to 6 C atoms. Some examples are dimethyl-, diethyl-, di-n-propyl-, di-i-propyl-, di-n-butyl-, methyl-ethyl-, dibenzyl-, benzyl-methyl-, diphenyl-, phenyl-methylamino and di(trimethylsilyl)amino.

Halogen (halo) as ligand or substituent is preferably F or Cl, particularly preferably Cl.

The cyclopentadienyl can be unsubstituted or substituted from one to five times by $C_1$–$C_4$alkyl, especially methyl, or —Si($C_1$–$C_4$alkyl), especially —Si($CH_3$)$_3$. Bridged cyclopentadienyls are in particular those of the formula $R_{36}$—A—$R_{36}$, in which $R_{36}$ is unsubstituted cyclopentadienyl or cyclopentadienyl which is substituted from one to five times by $C_1$–$C_4$alkyl, especially methyl, or by —Si($C_1$–$C_4$alkyl), especially —Si($CH_3$)$_3$, and A is —$CH_2$—$CH_2$—, —Si($CH_3$)$_2$—, —$CH_2$—, —Si($CH_3$)$_2$—Si($CH_3$)$_2$— or —Si($CH_3$)$_2$—O—Si($CH_3$)$_2$—. Particular preference is given, from this group, to unsubstituted cyclopentadienyl and indenyl.

Ethers as neutral ligands can be dialkyl ethers having 2 to 8 C atoms or cyclic ethers having 5 or 6 ring members. Some examples are diethyl ether, methyl ethyl ether, diethyl ether, di-n-propyl ether, di-i-propyl ether, di-n-butyl ether, ethylene glycol dimethyl ether, tetrahydrofuran and dioxan.

Nitriles as neutral ligands can be aliphatic or aromatic nitriles having 1 to 12, preferably 1 to 8 C atoms. Some examples are acetonitrile, propionitrile, butylnitrile, benzonitrile and benzylnitrile.

Tertiary amines and phosphines as neutral ligands can be those having 3 to 24, preferably 3 to 18 C atoms. Some examples are trimethylamine and -phosphine, triethylamine and -phosphine, tri-n-propylamine and -phosphine, tri-n-butylamine and -phosphine, triphenylamine and -phosphine, tricyclohexylamine and -phosphine, phenyldimethylamine and -phosphine, benzyldimethylamine and -phosphine, 2,6-dimethylphenyl-dimethylamine and -phosphine.

The tridentate monoanionic ligands can, for example, be hydro(trispyrazol-1-yl)borates or alkyl(trispyrazol-1-yl)borates which are unsubstituted or substituted from one to three times by $C_1$–$C_4$alkyl [see Trofimenko, S., Chem. Rev., 93:943–980 (1993)], or [$C_5$(R'$_5$)Co($R_{37}R_{38}$P=O)$_3$]$^-$, in which R' is H or methyl and $R_{37}$ and $R_{38}$ independently of one another are $C_1$–$C_4$alkyl, $C_1$–$C_4$alkoxy or phenyl [see Kläui, W., Angew. Shem. 102:661–670 (1990)].

Halogen as a substituent for the radicals $R_{32}$ and $R_{33}$ is preferably fluorine and particularly preferably chlorine. The substituents alkyl, alkoxy or alkoxy in alkoxymethyl or -ethyl contain preferably 1 to 4 and especially 1 or 2 C atoms. Examples are methyl, ethyl, n- and i-propyl, n-, i- and t-butyl, methoxy, ethoxy, n- and i-propyloxy and n-, i- and t-butyloxy.

$R_{32}$ and $R_{33}$ as alkyl contain preferably 1 to 12, particularly preferably 1 to 8 and especially preferably 1 to 4 C atoms. With particular preference they are branched alkyl. Some examples of $R_{32}$ are methoxy, ethoxy, n- and i-propyloxy, n-, i- and t-butyloxy, hexafluoro-i-propyloxy and hexa- and perfluorobutyloxy.

Some examples of substituted phenyl and benzyl for $R_{32}$ and $R_{33}$ are p-methylphenyl or benzyl, p-fluoro- or p-chlorophenyl or -benzyl, p-ethylphenyl or -benzyl, p-n- or i-propylphenyl or -benzyl, p-i-butylphenyl or -benzyl, 3-methylphenyl or -benzyl, 3-i-propylphenyl or -benzyl, 2,6-dimethylphenyl or -benzyl, 2,6-i-propylphenyl or -benzyl, 2,6-n- or -t-butylphenyl and -benzyl. $R_{33}$ is with particular preference unsubstituted or $C_1$–$C_4$alkyl- or $C_1$–$C_4$alkoxy-substituted phenyl.

In the case of the bisphenolate, the ligands involved can be of the formula

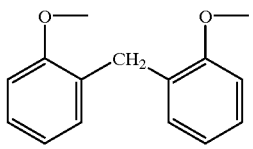

which are unsubstituted or in which the benzene rings are substituted once or twice by $C_1$–$C_4$alkyl.

In a preferred embodiment the molybdenum compounds, tungsten compounds, niobium compounds and tantalum compounds correspond in particular to the formulae VIII to VIIId,

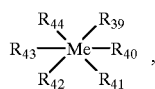

(VIII)

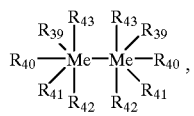

(VIIIa)

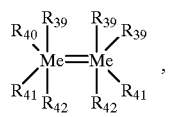

(VIIIb)

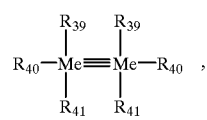

(VIIIc)

$$R_{40}\underset{R_{41}}{\overset{R_{39}}{\mid}}Me\equiv Me\underset{R_{41}}{\overset{R_{39}}{\mid}}R_{40},$$

(VIIId)

$$R_{43}\diagdown\overset{R_{39}}{\diagup}\underset{R_{42}\diagup}{Me_1}\diagdown R_{41}R_{40},$$

in which
Me is Mo(VI) or W(VI),
$Me_1$ is Nb(V) or Ta(V),
at least two, preferably 2 or 3, of the radicals $R_{39}$ to $R_{43}$ are a radical —$CH_2$—R of the formula VII, R is H, —$CF_3$, —$CR_{26}R_{27}R_{28}$, —$SiR_{29}R_{30}R_{31}$, unsubstituted or $C_1$–$C_6$alkyl- or $C_1$–$C_6$alkoxy-substituted $C_6$–$C_{16}$aryl or $C_4$–$C_{15}$heteroaryl having 1 to 3 heteroatoms selected from the group consisting of O, S and N;

$R_{26}$, $R_{27}$ and $R_{28}$ independently of one another are $C_1$–$C_{10}$alkyl which is unsubstituted or substituted by $C_1$–$C_{10}$alkoxy, or $R_{26}$ and $R_{27}$ have this meaning and $R_{28}$ is $C_6$–$C_{10}$aryl or $C_4$–$C_9$heteroaryl which is unsubstituted or substituted by $C_1$–$C_6$alkyl or $C_1$–$C_6$alkoxy; and $R_{29}$, $R_{30}$ and $R_{31}$ independently of one another are $C_1$–$C_{18}$alkyl, $C_5$- or $C_6$cycloalkyl, or are unsubstituted or $C_1$–$C_6$alkyl- or $C_1$–$C_6$alkoxy-substituted phenyl or benzyl;

pairs of the remaining radicals from $R_{39}$ to $R_{43}$ are =O or =N—$R_{33}$, and $R_{33}$ is linear or branched $C_1$–$C_{18}$ alkyl which is unsubstituted or substituted by $C_1$–$C_6$alkoxy, or is $C_5$- or $C_6$cycloalkyl which is unsubstituted or substituted by $C_1$–$C_6$alkyl, $C_1$–$C_6$alkoxy or halogen, or is phenyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl) amino, di($C_1$–$C_6$alkyl)amino-$C_1$–$C_3$alkyl or halogen, or is phenylethyl or benzyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl) amino-$C_1$–$C_3$alkyl or halogen; and/or the remaining radicals from $R_{39}$ to $R_{43}$ are secondary amino having 2 to 18 C atoms, $R_{32}$O— or $R_{32}$S—, halogen, indenyl, cyclopentadienyl or bridged biscyclopentadienyl or a neutral ligand, in which the $R_{32}$s independently of one another are linear or branched $C_1$–$C_{18}$alkyl which is unsubstituted or substituted by $C_1$–$C_6$alkoxy or halogen, or are $C_5$- or $C_6$cycloalkyl which is unsubstituted or substituted by $C_1$–$C_6$alkyl, $C_1$–$C_6$alkoxy or halogen, or are phenyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl) amino, di($C_1$–$C_6$alkyl)amino-$C_1$–$C_3$alkyl or halogen, or are phenylethyl or benzyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl) amino-$C_1$–$C_3$alkyl or halogen.

The radicals R and $R_{26}$ to $R_{33}$ are subject to the preferences indicated above.

In a particularly preferred embodiment, in the novel composition, use is made of molybdenum compounds and tungsten compounds of the formula VIII in which a) $R_{39}$ to $R_{44}$ are a radical of the formula VII —$CH_2$—R, or b) $R_{39}$ and $R_{40}$ are a radical of the formula VII —$CH_2$—R, $R_{41}$ and $R_{42}$ together are the radical =N—$R_{33}$, and $R_{43}$ and $R_{44}$ together, independently of one another, are $R_{32}$—O— or halogen, or c) $R_{43}$ and $R_{44}$ together and $R_{41}$ and $R_{42}$ together are the radical =N—$R_{33}$, and $R_{39}$ and $R_{40}$ are a radical of the formula VII —$CH_2$—R, where R, $R_{32}$ and $R_{33}$ have the earlier meanings. R, $R_{32}$ and $R_{33}$ are subject to the earlier preference.

Among the compounds of the formula VIIIc, particular preference i given to those in which $R_{39}$, $R_{40}$ and $R_{41}$ are a radical of the formula VIIa, and the radical of the formula VIIa is with particular preference —$CH_2$—Si($C_1$–$C_4$alkyl)$_3$.

With very particular preference, in the novel composition, use is made of molybdenum compounds and tungsten compounds of the formulae IX, IXa or IXb

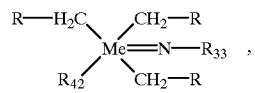
(IX)

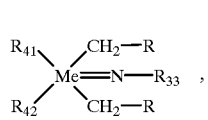
(IXa)

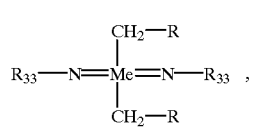

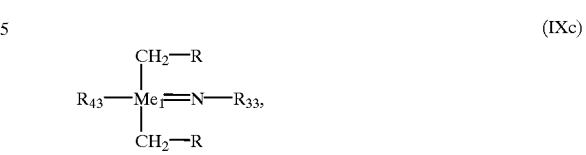
(IXb)

in which

Me is Mo(VI) or W(VI),

R is H, —C(CH$_3$)$_3$, —C(CH$_3$)$_2$—C$_6$H$_5$, —C$_6$H$_5$ or —Si(C$_1$–C$_4$alkyl)$_3$, $R_{33}$ is phenyl or phenyl substituted from 1 to 3 times by $C_1$–$C_4$alkyl or $C_1$–$C_4$alkoxy, $R_{41}$ is unsubstituted or fluorine-substituted, linear or—in particular—branched $C_1$–$C_4$alkoxy, and $R_{42}$ has the same meaning as $R_{41}$ or is F, Cl or Br. With particular preference $R_{41}$ is branched alkoxy which is unsubstituted or partially or completely substituted by F, for example i-propyloxy, i- and t-butyloxy, hexafluoropropyloxy and nonafluoropropyloxy. $R_{42}$ is preferably Cl.

In another particularly preferred embodiment, the novel composition comprises niobium compounds and tantalum compounds of the formula VIIId in which a) $R_{39}$ to $R_{43}$ are a radical of the formula VII —$CH_2$—R, or b) $R_{39}$ and $R_{40}$ are a radical of the formula VII—$CH_2$—R, $R_{41}$ and $R_{42}$ together are the radical =N—$R_{33}$, and $R_{43}$ is unsubstituted or substituted cyclopentadienyl, indenyl, $R_{32}$—O— or halogen, or c) $R_{39}$, $R_{40}$ and $R_{41}$ are a radical of the formula VII —$CH_2$—R, and $R_{42}$ and $R_{43}$ together are the radical =N—$R_{33}$, or $R_{39}$, $R_{40}$, $R_{41}$ and $R_{42}$ are a radical of the formula VII —$CH_2$—R, and $R_{43}$ is unsubstituted or substituted cyclopentadienyl or indenyl, $R_{32}$—O— or halogen, where R, $R_{32}$ and $R_{33}$ have the earlier meanings. R, $R_{32}$ and $R_{33}$ are subject to the earlier preferences.

With very particular preference, in the novel composition, use is made of niobium compounds or tantalum compounds of the formula IXc, IXd or IXe, (IXc)

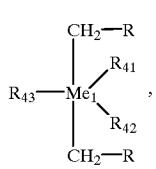

(IXd)

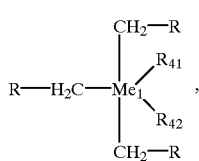

(IXe)

in which

Me$_1$ is Nb(V) or Ta(V),

R is H, —C(CH$_3$)$_3$, —C(CH$_3$)$_2$—C$_6$H$_5$, —C$_6$H$_5$ or —Si(C$_1$–C$_4$alkyl)$_3$, R$_{33}$ is phenyl or phenyl substituted from 1 to 3 times by C$_1$–C$_4$alkyl or C$_1$–C$_4$alkoxy, R$_{43}$ is formula IXc is the group —CH$_2$—R or F, Cl, Br, unsubstituted or fluorine-substituted, linear or—in particular—branched C$_1$–C$_4$alkoxy, unsubstituted or C$_1$–C$_4$alkyl- or C$_1$–C$_4$alkoxy-substituted phenyloxy or unsubstituted or C$_1$–C$_4$alkyl-substituted cyclopentadienyl;

R$_{41}$, R$_{42}$ and R$_{43}$ in formula IXd independently of one another are F, Cl, Br, unsubstituted or fluorine-substituted linear or—in particular—branched C$_1$–C$_4$alkoxy, unsubstituted or C$_1$–C$_4$alkyl- or C$_1$–C$_4$alkoxy-substituted phenyloxy or unsubstituted or C$_1$–C$_4$alkyl-substituted cyclopentadienyl or indenyl; and R$_{41}$ and R$_{42}$ in formula IXe independently of one another are F, Cl, Br, unsubstituted or fluorine-substituted linear or—in particular—branched C$_1$–C$_4$alkoxy, unsubstituted or C$_1$–C$_4$alkyl- or C$_1$–C$_4$alkoxy-substituted phenyloxy or unsubstituted or C$_1$–C$_4$alkyl-substituted cyclopentadienyl or indenyl. With particular preference the alkoxy is branched alkoxy which is unsubstituted or substituted partially or completely by F, for example i-propyloxy, i- and t-butyloxy, hexafluoropropyloxy and nonafluoropropyloxy.

Among the molybdenum, tungsten, niobium and tantalum compounds, a preferred subgroup comprises those in which at least one halogen selected from the group consisting of F, Cl, Br and I is attached to the metal atom if two of the radicals of the formula VIIa is [sic] the group —CH$_2$—SiR$_{29}$R$_{30}$R$_{31}$, R$_{29}$, R$_{30}$ and R$_{31}$ being subject to the earlier preferences.

Some examples of molybdenum compounds and tungsten compounds are:

W(=N—C$_6$H$_5$)(OC(CH$_3$)$_3$)(Cl)[(CH$_2$Si(CH$_3$)$_3$)]$_2$,
W(=NC$_6$H$_5$)[CH$_2$Si(CH$_3$)$_3$]$_3$Cl, W(=N—C$_6$H$_5$)(OC(CF$_3$)$_2$CH$_3$)$_2$[(CH$_2$Si(CH$_3$)$_3$)]$_2$,
[(CH$_3$)$_3$SiCH$_2$]$_3$Mo=Mo[CH$_2$Si(CH$_3$)$_3$]$_3$,
Mo(=N-2,6-diisopropylC$_6$H$_3$)$_2$[(CH$_2$C(CH$_3$)$_2$—C$_6$H$_5$)]$_2$,
Mo(=N-2,6-diisopropylC$_6$H$_3$)$_2$[(CH$_2$—C$_6$H$_5$)]$_2$,
Mo(=N-2,6-dimethylC$_6$H$_3$)$_2$[(CH$_2$—C$_6$H$_5$)]$_2$ and
Mo(=N-2,6-dimethylC$_6$H$_3$)$_2$(CH$_3$)$_2$(tetrahydrofuran).

Some examples of niobium(V) compounds and tantalum (V) compounds are [Cp is cyclopentadienyl and Me is Nb(V) or Ta(V)]:

Me[CH$_2$Si(CH$_3$)$_3$]$_3$Cl$_2$, CpMe[OCCH$_3$(CF$_3$)$_2$]$_2$[CH$_2$—C$_6$H$_5$]$_2$,
Cp$_2$Me[CH$_2$C(CH$_3$)$_2$—C$_6$H$_5$]$_3$, Me(2,6-dimethylphenyloxy)$_2$(CH$_3$)$_3$,
Cp$_2$Me(Methyl)$_2$[OCH(CH$_3$)$_2$], Me[CH$_2$Si(CH$_3$)$_3$]$_5$,
Me(=N—C$_6$H$_5$)[OC(CF$_3$)$_2$CH$_3$][CH$_2$Si(CH$_3$)$_3$]$_2$,
Me(=N-2,6-dimethylC$_6$H$_3$)[CH$_2$—C$_6$H$_5$]$_3$,
Me(=N-2,6-diisopropylC$_6$H$_3$)[(CH$_2$C(CH$_3$)$_2$—C$_6$H$_5$]$_2$Cl,
CpMe[OC(CH$_3$)$_3$]$_2$[CH$_2$—C$_6$H$_5$]$_2$,
Me(=N-2,6-diisopropylC$_6$H$_3$)[CH$_2$—C$_6$H$_5$]$_3$, Me(2,6-diisopropylphenyloxy)$_2$(CH$_3$)$_3$,
Me(=N-2,6-dimethylC$_6$H$_3$(CH$_3$)$_3$, Me[CH$_2$Si(CH$_3$)$_3$]$_3$[OCH(CH$_3$)]$_2$, Cp$_2$Me(Methyl)$_3$,
Cp$_2$Me[CH$_2$—C$_6$H$_5$]$_3$, Cp$_2$Me[CH$_2$Si(CH$_3$)$_3$]$_3$, CpMe[OCH(CH$_3$)$_2$]$_2$[CH$_2$Si(CH$_3$)$_3$]$_2$,
Cp$_2$Me[2,6-dimethylC$_6$H$_3$O)][CH$_2$Si(CH$_3$)$_3$]$_2$,
Me(=N—C$_6$H$_5$)[OC(CH$_3$)$_3$][CH$_2$Si(CH$_3$)$_3$]$_2$.

In another preferred embodiment, the niobium compounds, tantalum compounds, molybdenum compounds and tungsten compounds correspond in particular to the formulae X or Xa

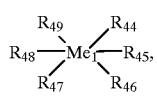

(X)

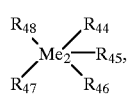

(Xa)

in which

Me$_1$ is Mo(VI) or W(VI);

Me$_2$ is Nb(V) or Ta(V);

one of the radicals R$_{44}$ to R$_{49}$ is a radical —CH$_2$—SiR$_{29}$R$_{30}$R$_{31}$ of the formula VIIa; at least one of the radicals R$_{44}$ to R$_{49}$ is F, Cl or Br;

R$_{29}$, R$_{30}$ and R$_{31}$ independently of one another are C$_1$–C$_6$alkyl, C$_5$- or C$_6$cycloalkyl, or unsubstituted or C$_1$–C$_6$alkyl- or C$_1$–C$_6$alkoxy-substituted phenyl or benzyl;

in formula X two or pairs, and in formula Xa two, of the remaining radicals from R$_{44}$ to R$_{49}$, in each case together, are =O or =N—R$_{33}$, and R$_{33}$ is linear or branched C$_1$–C$_{18}$alkyl which is unsubstituted or substituted by C$_1$–C$_6$alkoxy, or is C$_5$- or C$_6$cycloalkyl which is unsubstituted or substituted by C$_1$–C$_6$alkyl, C$_1$–C$_6$alkoxy or halogen, or is phenyl which is unsubstituted or substituted by C$_1$–C$_6$alkyl, C$_1$–C$_6$alkoxy, C$_1$–C$_6$alkoxymethyl, C$_1$–C$_6$alkoxyethyl, di(C$_1$–C$_6$alkyl)amino, di(C$_1$–C$_6$alkyl)amino-C$_1$–C$_3$alkyl or halogen, or is phenylethyl or benzyl which is unsubstituted or substituted by C$_1$–C$_6$alkyl, C$_1$–C$_6$alkoxy, C$_1$–C$_6$alkoxymethyl, C$_1$–C$_6$alkoxyethyl, di(C$_1$–C$_6$alkyl)amino, di(C$_1$–C$_6$alkyl)amino-C$_1$–C$_3$alkyl or halogen, and the remaining radicals R$_{44}$ to R$_{48}$ are secondary amino having 2 to 18 C atoms, R$_{32}$O— or R$_{32}$S—, halogen, unsubstituted or substituted cyclopentadienyl, indenyl or bridged biscyclopentadienyl or a neutral ligand in which the R$_{32}$s independently of one another are linear or branched C$_1$–C$_{18}$alkyl which is unsubstituted or substituted by C$_1$–C$_6$alkoxy or halogen, or are C$_5$- or C$_6$cycloalkyl which is unsubstituted or substituted by C$_1$–C$_6$alkyl, C$_1$–C$_6$alkoxy or halogen, or are phenyl which is unsubstituted or substituted by C$_1$–C$_6$alkyl, C$_1$–C$_6$alkoxy, C$_1$–C$_6$alkoxymethyl, C$_1$–C$_6$alkoxyethyl, di(C$_1$–C$_6$alkyl)amino, di(C$_1$–C$_6$alkyl)amino-C$_1$–C$_3$alkyl or halogen, or are phenylethyl or benzyl which is unsubstituted or substituted by C$_1$–C$_6$alkyl, C$_1$–C$_6$alkoxy, C$_1$–C$_6$alkoxymethyl, C$_1$–C$_6$alkoxyethyl, di(C$_1$–C$_6$alkyl)amino, di(C$_1$–C$_6$alkyl)amino-C$_1$–C$_3$alkyl or halogen; or in The formulae X and Xa the remaining radicals of R$_{44}$ to R$_{49}$ independently of one another are secondary amino having 2 to 18 C atoms, R$_{32}$O— or R$_{32}$S—, halogen, unsubstituted or substituted cyclopentadienyl, indenyl or bridged biscyclopentadienyl or a neutral ligand, in which the R$_{32}$s independently of one another are linear or branched $C_1$–$C_{18}$alkyl which is unsubstituted or substituted by $C_1$–$C_6$alkoxy or halogen, or are $C_5$- or $C_6$cycloalkyl which is unsubstituted or substituted by $C_1$–$C_6$alkyl, $C_1$–$C_6$alkoxy or halogen, or are phenyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl or halogen, or are phenylethyl or benzyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl or halogen.

The radicals $R_{29}$ to $R_{33}$ are subject to the preferences indicated above.

In a particularly preferred embodiment the novel composition comprises niobium compounds, tantalum compounds, molybdenum compounds and tungsten compounds of the formula X and Xa in which $R_{44}$ is a radical of the formula VIIa —$CH_2$—Si($R_{29}R_{30}R_{31}$)$_3$ and $R_{45}$ is F, Cl or Br; and (a) in formula X $R_{46}$ and $R_{47}$ and also $R_{48}$ and $R_{49}$, in each case together, are the radical =N—$R_{33}$, or $R_{46}$ and $R_{47}$ together are the radical =N—$R_{33}$, and $R_{48}$ and $R_{49}$ independently of one another are unsubstituted or substituted cyclopentadienyl, indenyl, $R_{32}$—O— or halogen, or (b) in formula Xa $R_{46}$ and $R_{47}$ together are the radical =N—$R_{33}$, and $R_{48}$ are unsubstituted or substituted cyclopentadienyl, indenyl, $R_{32}$—O— or halogen, or in formula Xa $R_{46}$, $R_{47}$ and $R_{48}$ independently of one another are unsubstituted or substituted cyclopentadienyl, $R_{32}$—O— or halogen, where $R_{29}$ to $R_{33}$ have the earlier meanings. $R_{29}$, $R_{30}$, $R_{31}$, $R_{32}$ and $R_{33}$ are subject to the earlier preferences.

With very particular preference, the novel composition comprises niobium compounds, tantalum compounds, molybdenum compounds or tungsten compounds of the formula XI, XIa, XIb or XIc

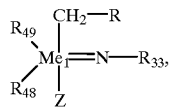 (XI)

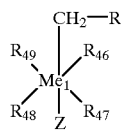 (XIa)

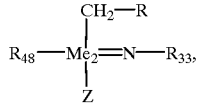 (XIb)

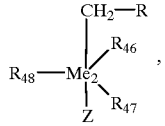 (XIc)

in which

Me$_1$ is Mo(VI) or W(VI);

Me$_2$ is Nb(V) or Ta(V);

R is —Si($C_1$–$C_4$alkyl)$_3$;

Z is F, Cl or Br;

$R_{33}$ is phenyl or phenyl which is substituted from 1 to 3 times by $C_1$–$C_4$alkyl or $C_1$–$C_4$alkoxy, (a) $R_{48}$ and $R_{49}$ in formula XI together are the group =NR$_{33}$ or individually, independently of one another, are F, Cl, Br, unsubstituted or fluorine-substituted linear or—in particular—branched $C_1$–$C_4$alkoxy, unsubstituted or $C_1$–$C_4$alkyl- or $C_1$–$C_4$alkoxy-substituted phenyloxy or unsubstituted or $C_1$–$C_4$alkyl-substituted cyclopentadienyl or indenyl;

(b) $R_{46}$, $R_{47}$ and $R_{48}$ and $R_{49}$ in formula XIa independently of one another are F, Cl, Br, unsubstituted or fluorine-substituted, linear or—in particular—branched $C_1$–$C_4$alkoxy, unsubstituted or $C_1$–$C_4$alkyl- or $C_1$–$C_4$alkoxy-substituted phenyloxy or unsubstituted or $C_1$–$C_4$alkyl-substituted cyclopentadienyl or indenyl;

(c) $R_{48}$ in formula XIb is F, Cl, Br, unsubstituted or fluorine-substituted, linear or—in particular—branched $C_1$–$C_4$alkoxy, unsubstituted or $C_1$–$C_4$alkyl- or $C_1$–$C_4$alkoxy-substituted phenyloxy or unsubstituted or $C_1$–$C_4$alkyl-substituted cyclopentadienyl or indenyl; and (d) $R_{46}$, $R_{47}$ and $R_{48}$ in formula XIc independently of one another are F, Cl, Br, unsubstituted or fluorine-substituted, linear or—in particular—branched $C_1$–$C_4$alkoxy, unsubstituted or $C_1$–$C_4$alkyl- or $C_1$–$C_4$alkoxy-substituted phenyloxy or unsubstituted or $C_1$–$C_4$alkyl-substituted cyclopentadienyl or indenyl. With particular preference the alkoxy is branched alkoxy which is unsubstituted or substituted partially or completely by F, for example i-propyloxy, i- and t-butyloxy, hexafluoropropyloxy and nonafluoropropyloxy. The phenyloxy radical is especially the phenyloxy substituted in the 2,6positions by $C_1$–$C_4$alkyl, for example 2,6-dimethylphenyloxy. Examples of substituted cyclopentadienyl radicals are mono- to pentamethylcyclopentadienyl and trimethylsilylcyclopentadienyl. $R_{33}$ is preferably phenyl or $C_1$—$C_1$alkyl-substituted phenyl, especially phenyl, 3,5-dimethyl-2,6-dimethyl-, 3,5-diethyl- and 2,6-diethylphenyl.

Very particularly preferred compounds in the novel composition are those of the formulae XII, XIIa, XIIb and XIIc $(R_{33}$—N=$)_2$Me$_1$X$_a$CH$_2$Si(CH$_3$)$_3$ (XII), $(R_{33}$—N=)R$_{46}$Me$_1$X$_a$(OR$_{32}$)CH$_2$Si(CH$_3$)$_3$ (XIIa), $R_{46}R_{47}$Me$_2$X$_a$(OR$_{32}$)CH$_2$Si(CH$_3$)$_3$ (XIIb), $R_{33}$—N=Me$_2$X$_a$(OR$_{32}$)CH$_2$Si(CH$_3$)$_3$ (XIIc), in which Me$_1$ is Mo(VI) or W(VI);

Me$_2$ is Nb(V) or Ta(V); and

X$_a$ is F, Cl or Br;

$R_{33}$ is phenyl or phenyl substituted by 1 or 2 $C_1$–$C_4$alkyl groups;

$R_{32}$ is branched, optionally partially or completely fluorine-substituted $C_3$- or $C_4$alkyl or phenyloxy or phenyloxy substituted from 1 to 3 times by methyl or ethyl groups;

$R_{46}$ and $R_{47}$ independently of one another are cyclopentadienyl which is unsubstituted or substituted by 1 to 5 methyl groups or are X$_a$ or $R_{32}$O—; and $R_{48}$ is cyclopentadienyl which is unsubstituted or substituted by 1 to 5 methyl groups or is $X_a$ or $R_{32}O-$.

Some examples of niobium(V) compounds, tantalum(V) compounds, molybdenum(VI) compounds and tungsten(VI) compounds are [Cp is cyclopentadienyl and Me is Nb(V) or Ta(V)]:

Me(=N—C$_6$H$_5$)[OCH(CH$_3$)$_2$][(CH$_2$Si(CH$_3$)$_3$]Cl, Cp$_2$Me[OC(CH$_3$)$_3$][(CH$_2$Si(CH$_3$)$_3$]Cl, Me(=N—C$_6$H$_5$) [OCH(CF$_3$)$_2$][(CH$_2$Si(CH$_3$)$_3$]Cl, CpMe[OCH(CH$_3$)$_2$]$_2$ [(CH$_2$Si(CH$_3$)$_3$]Br, Me(=N-2,6-diisopropylC$_6$H$_3$)[(CH$_2$Si (CH$_3$)$_3$]Cl$_2$, (C$_6$H$_5$O)$_2$CpMe[(CH$_2$Si(CH$_3$)$_3$]Cl, Me(=N-2, 6-diisopropylC$_6$H$_3$)[(CH$_3$)$_2$CHO][(CH$_2$Si(CH$_3$)$_3$]Cl, Cp$_2$Me[(CH$_2$Si(CH$_3$)$_3$]Cl$_2$, CpMe[OCH(CH$_3$)$_2$]$_2$[(CH$_2$Si (CH$_3$)$_3$]Cl, W(=N—C$_6$H$_5$)[(OC(CH$_3$)$_3$][CH$_2$—Si(CH$_3$)$_3$] Cl$_2$, CpMe[OCH(CF$_3$)$_2$]$_2$[(CH$_2$Si(CH$_3$)$_3$]Cl, W(=N— C$_6$H$_5$)[(OC(CH$_3$)$_3$]$_2$[CH$_2$—Si(CH$_3$)$_3$]Cl, Cp$_2$Me(methyl) [(CH$_2$Si(CH$_3$)$_3$]Cl, Mo(=N-2,6-diisopropylC$_6$H$_3$)$_2$[CH$_2$— Si(CH$_3$)$_3$]Cl, Cp$_2$Me[OCH(CH$_3$)$_2$][(CH$_2$Si(CH$_3$)$_3$]Cl, CpMe[OC(CH$_3$)(CF$_3$)$_2$]$_2$[(CH$_2$Si(CH$_3$)$_3$]Cl, [OCH(CH$_3$)$_2$]$_2$Me[CH$_2$Si(CH$_3$)$_3$]Cl$_2$, (=N-2,6-dimethylC$_6$H$_3$)CpMe[(CH$_2$Si(CH$_3$)$_3$]Cl, Me[CH$_2$Si(CH$_3$)$_3$] [OCH(CH$_2$)](CF$_3$O)$_2$Cl, Mo$_2$[(CH$_2$—Si(CH$_3$)$_3$)(OCH$_2$C (CH$_3$)$_3$)Cl]$_2$, (2,6-diisopropylphenyloxy)$_2$Me[CH$_2$Si(CH$_3$)$_3$]Cl$_2$, Mo(=N—C$_6$H$_5$)$_2$[CH$_2$—Si(CH$_3$)$_3$]Cl, (=N-2,6-dimethylC$_6$H$_3$)Me[2,6-dimethylC$_6$H$_3$O)][(CH$_2$Si(CH$_3$)$_3$)] Cl, Me(=N-2,6-dimethylC$_6$H$_3$)(2,6-dimethyl-C$_6$H$_5$O) [CH$_2$Si(CH$_3$)$_3$]Cl, Mo(=N-2,6-diisopropylC$_6$H$_3$)[(OCH$_2$C (CH$_3$)$_3$]$_2$[CH$_2$—Si(CH$_3$)$_3$]Cl, Me(=N-2,6-dimethylC$_6$H$_3$) ((CF$_3$)$_2$CHO)[CH$_2$Si(CH$_3$)$_3$]Cl and Me(2,6-dimethylphenyloxy)(CH$_3$O)$_2$[(CH$_2$Si(CH$_3$)$_3$]Cl.

The niobium compounds, tantalum compounds, molybdenum compounds and tungsten compounds to be used in accordance with the invention are known or can be prepared by known and analogous processes, starting from metal halides which may be appropriately substituted, by means of Grignard reactions [Schrock, R. R., Murdzeck, J. S., Bazan, G. C., Robbins, J., DiMare, M., O'Regan, M., J. Am. Chem. Soc., 112:3875–3886 (1990)].

Catalytic amounts in the context of the present invention is preferably an amount from 0.001 to 20 mol-%, more preferably 0.01 to 15 mol-%, particularly preferably from 0.01 to 10 mol-% and, with very particular preference, from 0.01 to 5 mol-%, based on the amount of the monomer. If the catalysts have a high photocatalytic activity, then in this case amounts from 0.001 to 2% by weight are very particularly preferred.

The novel composition can comprise solvents, especially if it is used to prepare coatings. A very particular advantage is that it is not necessary to use any solvents, since the catalysts themselves are readily soluble in strained cycloolefins containing only carbon and hydrogen. By this means there are made possible polymerizations in bulk which were hitherto impossible to carry out, constituting particular technical and ecological advantages in connection with the preparation of moldings and coatings.

Suitable inert solvents are, for example, protic-polar and aprotic solvents, which can be used alone or in mixtures of at least two solvents. Examples are ethers (dibutyl ether, tetrahydrofuran, dioxane, ethylene glycol monomethyl or dimethyl ether, ethylene glycol monoethyl or diethyl ether, diethylene glycol diethyl ether, triethylene glycol dimethyl ether), halogenated hydrocarbons (methylene chloride, chloroform, 1,2-dichloroethane, 1,1,1-trichloroethane, 1,1, 2,2-tetrachloroethane), carboxylic esters and lactones (ethyl acetate, methyl propionate, ethyl benzoate, 2-methoxyethyl acetate, γ-butyrolactone, δ-valerolactone, pivalolactone), carboxyamides and lactams (N,N-dimethylformamide, N,N-diethylformamide, N,N-dimethylacetamide, tetramethylurea, hexamethylphosphoric triamide, γ-butyrolactam, ε-caprolactam, N-methylpyrrolidone, N-acetylpyrrolidone, N-methylcaprolactam), sulfoxides (dimethyl sulfoxide), sulfones (dimethyl sulfone, diethyl sulfone, trimethylene sulfone, tetramethylene sulfone), tertiary amines (N-methylpiperidine, N-methylmorpholine), aliphatic and aromatic hydrocarbons, for example petroleum ether, pentane, hexane, cyclohexane, methylcyclohexane, benzene or substituted benzene (chlorobenzene, o-dichlorobenzene, 1,2,4-trichlorobenzene, nitrobenzene, toluene, xylene) and nitriles (acetonitrile, propionitrile, benzonitrile, phenylacetonitrile). Preferred solvents are aprotic polar and apolar solvents.

The choice of solvents depends principally on the properties of the one-component catalysts which must not be deactivated by the solvents used. With the one-component catalysts used it is advisable to exclude oxygen and moisture. The compositions are storage stable, storage in the dark being advisable because of the photosensitivity.

The novel composition can include formulation auxiliaries. Known auxiliaries are antistats, antioxidants, light stabilizers, plasticizers, dyes, pigments, fillers, reinforcing fillers, lubricants, adhesion promoters, viscosity-increasing agents and demolding auxiliaries. The fillers can be present in surprisingly high proportions without adversely affecting the polymerization, for example in amounts of up to 70% by weight, preferably from 1 to 70% by weight, more preferably from 5 to 60% by weight, with particular preference from 10 to 50% by weight and, with especial preference, from 10 to 40% by weight, based on the composition. A very large number of fillers, including reinforcing fillers, are known for improving the optical, physical, mechanical and electrical properties. Some examples are glass and quartz in the form of powders, spheres and fibers, metal oxides and semimetal oxides, carbonates such as $MgCO_3$, $CaCO_3$, dolomite, metal sulfates such as gypsum and heavy spar, natural and synthetic silicates such as talc, zeolites, wollastonite, felspars, aluminas such as chine clay, ground minerals, whiskers, carbon fibers, polymer fibers or polymer powders and carbon black.

Viscosity-increasing agents are, in particular, metathesis polymers which have olefinically unsaturated groups and which can be incorporated into the polymer during the polymerization. Such metathesis polymers are known and are obtainable commercially, for example, under the trade name Vestenamere®. Other viscosity-increasing agents are polybutadiene, polyisoprene or polychlorobutadiene, and also copolymers of butadiene, isoprene and chloroprene with olefins. The viscosity-increasing agents can be present in an amount of from 0.1 to 50, preferably from 1 to 30 and, with particular preference, from 1 to 20% by weight based on the composition. When using fillers it is judicious to obtain the optical transparency for the polymerization or to conduct the polymerization in thin films.

A further subject of the invention is a process for preparing polymers from acetylenes by photometathesis polymerization, wherein a composition comprising at least one nonvolatile acetylene alone or together with a strained cycloolefin and catalytic amounts of at least one one-component catalyst selected from the group consisting of molybdenum compounds, tungsten compounds, niobium compounds and tantalum compounds, which either comprise at least two methyl groups or two monosubstituted methyl groups without α hydrogen atoms in the substituent or comprise at least one halogen and only one silylmethyl group attached to the metal, (a) is polymerized by irradiation, or (b) the one-component catalyst is activated by brief irradiation and the polymerization is brought to an end by heating.

The polymers obtainable are polyacetylenes comprising structural units of the formula XIII

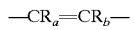

$$—CR_a\!\!=\!\!CR_b—  \quad\quad\quad\quad\quad (XIII),$$

in which $R_a$ and $R_b$ can have the meanings indicated above. Another subject of the invention are the novel polymers. In accordance with the invention it is possible to form cis polymers, trans polymers or mixed forms. In the case of copolymerization with strained cycloolefins, block copolymers or, directly, alloys of both polymers are principally obtained. The formation of random polymers is less pronounced. The polymers can have a mean molecular weight ($\overline{Mw}$) of, for example, from 500 up to 2 million daltons, preferably from 1000 to 1 million daltons (determined by GPC by comparison with narrowly distributed polystyrene standards). Insofar as the cycloolefins contain at least 2 double bonds, crosslinked polymers can also be formed.

Heating may denote a temperature from above room temperature, for example 30 to 300° C., preferably 40 to 250° C., particularly preferably 40 to 200° C. and, with particular preference, from 50 to 150° C. The polymerization times depend essentially on the catalyst activity.

In the process according to the invention it is not necessary to maintain the irradiation for the reaction mixture over the entire reaction period. Once the polymerization has been photochemically initiated, the subsequent course of the reaction ensues automatically even in the dark. Advantageously, irradiation is carried out with light having a wavelength in the range from 50 nm to 1000 nm, preferably in the range from 200 nm to 500 nm and, with very particular preference, in the UV region. The period of irradiation is dependent on the nature of the light source. Examples of suitable irradiation sources are sunlight, laser radiation, X-rays and, in particular, UV radiation sources. Preference is given in accordance with the invention to the use of UV lasers or UV lamps. Irradiation of the catalyst can be carried out before, during and after the addition of the monomers.

Suitable radiation times range from seconds to several hours, in particular from minutes from hours. The sequence of addition of monomers and catalyst is not critical. The monomer can be either introduced as initial charge or added after the catalyst has been introduced. Likewise, the catalyst can be irradiated beforehand and then the monomer can be added. In addition, it also possible to irradiate the solution comprising the catalyst and monomer.

The novel process is carried out preferably at from room temperature to slightly elevated temperature in the case of exclusive irradiation. A temperature increase serves to increase the reaction rate. Only in exceptional cases do the catalysts used initiate per se a thermal metathesis polymerization, with crosslinking, at the chosen temperatures. At the temperatures chosen for acceleration of the reaction, therefore, it is predominantly photopolymerization which takes place. However, it should be mentioned that by sufficient irradiation the catalysts can be converted to thermoactive catalysts.

In particular, the novel process is conducted with irradiation preferably at temperatures from −20 to +110° C. particularly preferably from 20 to 80° C.

The period of irradiation depends essentially on the desired reaction regime. Short-term irradiation, for example, is chosen when it is desired to initiate the polymerization only by irradiation and to bring it to an end by heating. Short term can mean an irradiation time of up to 60 seconds, preferably from 5 to 60 seconds and, with particular preference, from 10 to 40 seconds. A longer irradiation time is chosen, for example, when it is desired to conduct the polymerization permanently with irradiation and to bring the final polymerization to an end only by afterheating.

A very particular and surprising advantage of the novel process is that the one-component catalysts used act when irradiated as thermal catalysts. This opens up the possibility, after a short irradiation time, of continuing the polymerization, and bringing it to an end, by supplying heat, which in various sectors of the production of moldings or coatings offers economic and technical advantages.

The thermal polymerization is preferably carried out at temperatures from 40 to 300° C., more preferably from 50 to 200° C. and, with particular preference, from 60 to 150° C.

Using the novel process it is possible to produce materials for the production, by machining or directly, of shaped articles of all kinds, and to prepare coatings and relief images.

Depending on the monomer used, the novel polymers can have very different properties. Some feature very high permeability to gas, and especially to oxygen, low dielectric constants, high heat resistance (high glass transition temperatures, good thermal stability and low water absorption. Others have outstanding optical properties, for example high transparency and low refractive indices. Another feature of particular note is the low shrinkage. Consequently, they can be used in a wide variety of technical fields, for example as optical materials and contact lenses, as gaspermeable films or membranes for separating gas mixtures, as holographic recording material and, in the electrical industry, as insulating materials. Furthermore, the polymers can be converted by treatment with oxidizing agents into electrically conducting materials which can be used as electrical conductors (for example printed circuits) or electrodes. It is also possible to increase only the electrical conductivity of the surfaces of moldings made from these polymers by treatment with oxidizing agents subsequently.

The novel compositions are notable, as layers on the surfaces of carrier materials, by a high adhesive strength. In addition, the coated materials feature very high surface smoothness and gloss. Among the good mechanical properties, particular mention should be made of the low shrinkage and the high impact strength, but also of the thermal stability. Mention should also be made of the ready demoldability in connection with processing in molds, and the high solvent resistance.

These polymers are suitable for producing medical equipment, implants or contact lenses; for producing electronic components; as binders for coating materials; as photocurable compositions for modeling or as adhesives for bonding substrates with low surface energies (for example Teflon, polyethylene and polypropylene), and as photopolymerizable composition in stereolithography. The novel compositions can also be used for the preparation of coatings by photopolymerization, it being possible to use clear (transparent) and even pigmented compositions. Both white pigments and color pigments can be used.

The novel photocurable compositions are particularly suitable for producing protective coats and relief images. A further subject of the invention is a variant of the novel process for preparing coated materials or relief images on carrier materials, wherein a novel composition with or without solvent is applied as a layer to a carrier, for example by means of dipping, spreading, pouring, rolling, knife-coating or spin-coating techniques, the solvent (if used) is removed, and the layer is irradiated to polymerize it, or the layer is irradiated through a photomask, is subjected if desired to thermal aftercuring following the irradiation, and then the nonirradiated areas are removed with a solvent. This can be followed by heat treatment. Using this process it is possible to modify or protect surfaces of carrier materials, or to prepare, for example, printed circuits, printing plates or printing rollers. In the preparation of printed circuits the novel compositions can also be employed as solder resists. Other possible applications are the production of screen printing masks, and use as radiation-curable printing inks for offset, screen and flexographic printing.

A further subject of the present invention is a coated carrier material wherein a layer of a novel composition has been applied to a carrier material.

Likewise the subject of the present invention is a coated carrier material having a cured layer of a novel composition. The extraordinarily high adhesive strength of the layers, even on metal surfaces, is deserving of particular emphasis, even when the polymers involved are pure hydrocarbon polymers.

Examples of suitable carrier materials are those made of glass, minerals, ceramics, plastics, wood, semimetals, metals, metal oxides and metal nitrides. The layer thicknesses depend essentially on the desired use and can, for example, be from 0.1 to 1000 $\mu$m, preferably from 0.5 to 500 $\mu$m and, with particular preference, from 1 to 100 $\mu$m. The coated materials are notable for high adhesive strength and good thermal and mechanical properties.

The preparation of the coated materials according to the invention can be carried out by known methods such as, for example, spreading, knife coating, pouring techniques, such as curtain coating, or spin coating.

The novel compositions are also suitable for preparing rubberlike or thermoplastic polymers which, following the addition of, for example, free-radical initiators as crosslinking agents, can be crosslinked further.

The novel compositions can also be used as heat- or radiation-curable adhesives for the firm bonding of a wide variety of materials, with the achievement of outstanding peel strengths being possible.

The novel polymers feature—in addition to the high adhesive strengths, the outstanding processability, the good surface properties (smoothness, gloss), the high crosslinking density and the resistance to solvents and other liquids—in particular, very good physico-mechanical properties, for example high temperature stability, fracture resistance, flexural strength and impact strength and outstanding electrical properties, for example low surface tensions and surface charges (very low $\epsilon$ and tan $\delta$ values). Also deserving of mention are the high oxygen permeability and the low water absorption. Polymers composed only of carbon and hydrogen are particularly valuable from an ecological standpoint, since they can, for example, be completely recycled by pyrolysis.

A further subject of the invention are shaped articles comprising polymers of the novel compositions.

The examples which follow illustrate the invention in more detail.

A) Preparing Polymers

EXAMPLES A1–A8

The catalyst, with or without solvent, is charged to a Schlenk vessel. Then the acetylene, with or without solvent, is added and the vessel is sealed. The mixture is irradiated with stirring. After about 15 seconds a rise in viscosity is observed. The reaction is terminated directly or after the standing time and the reaction mixture is poured into 100 ml of ethanol. The precipitated polymer is filtered off, washed with ethanol and then dried in vacuo. The polymer is characterized by gel permeation chromatography [GPC; solvent tetrahydrofuran; the number ($M_n$) and weight ($M_w$) averages of the molecular weight are determined relative to the polystyrene calibration standards] and $^1$H-NMR (Bruker 300 MHz; solvent CDCl$_3$).

An identical experiment without exposure at 45° C. does not give a rise in viscosity, and no polymer precipitates after addition of ethanol.

The catalysts employed are:

A=W(NC$_6$H$_5$)[OC(CH$_3$)][CH$_2$Si(CH$_3$)$_3$]$_2$Cl;

B=W(NC$_6$H$_5$)[OCCH$_3$(CF$_3$)$_2$]$_2$[CH$_2$Si(CH$_3$)$_3$]$_2$;

C=W(N-2,6-(CH$_3$)$_2$—C$_6$H$_3$)(2,6-(CH$_3$)$_2$—C$_6$H$_3$O)[CH$_2$Si(CH$_3$)$_3$]$_2$Cl;

D=[(CH$_3$)$_3$SiCH$_2$]$_3$Mo≡Mo[CH$_2$Si(CH$_3$)$_3$];

E=Ta[CH$_2$Si(CH$_3$)$_3$]$_3$Cl$_2$

The acetylenes employed are:

(45)=H—C≡C—C(CH$_3$)$_3$;

(46)=H$_3$C—C≡C—Si(CH$_3$)$_3$;

(47)=H—C≡C—Si(CH$_3$)$_3$.

The exposure source used is a 200 W medium-pressure mercury vapor UV lamp (Osram HBO 200 W/2, manufacturer Spindler & Hoyer, Göttingen).

The reaction conditions and results are indicated in Table 1:

TABLE 1

| Ex. | Monomer amount | Catalyst [mg] | S | Light | Standing time | Yield [mg] | MW |
|---|---|---|---|---|---|---|---|
| 1 | 1.70 g (45) | 50 B | — | 1 | — | 1700 | — |
| 2 | 1.38 g (45) | 50 B | 5 | 15 | 14/50 | 910 | 78/1000 |
| 3 | 0.30 g (45) | 6 A | 1 | 5 | 14/45 | 5 | crosslinked |
| 4 | 0.30 g (45) | 6 C | 1 | 5 | 2/45; 48/25 | 15 | 65/1200 |
| 5 | 0.30 g (45) | 6 E | 1 | 5 | 14/25 | 15 | crosslinked |
| 6 | 0.41 g (46) | 20 D | 10 | 15 | 4/25 | 250 | 92/1900 |
| 7 | 5 ml (46) | 70 E | 15 | 20 | 14/25 | 350 | 1080/2010 |
| 8 | 5.00 g (47) | 80 B | — | 10 | 24/45 | 280 | — |

S: solvent = toluene [ml]

Light: exposure time 25° C. [min]

TABLE 1-continued

| Ex. | Monomer amount | Catalyst [mg] | S | Light | Standing time | Yield [mg] | MW |
|---|---|---|---|---|---|---|---|

Standing time: before working up [h]/temperature [° C.]
MW: molecular weight (GPC g/mol) [$M_n(k)/M_w(k)$]

EXAMPLES A9–A17

Examples A9–A17 are carried out in a manner similar to Examples A1–A8 but in the presence of comonomers. Comonomers employed are compounds (1), (27) and (31). The reaction conditions and results are indicated in Table 2:

TABLE 2

| Ex. | Monomer amount | Catalyst [mg] | S | Light | Standing time | Yield [mg] | MW |
|---|---|---|---|---|---|---|---|
| 10 | 0.45 g (45) 0.42 g (1) | 50 B | 5 | 10 | 24/25 | 400 | 8/570 |
| 11 | 0.25 g (45) 0.85 g (1) | 50 B | 5 | 10 | 24/25 | 1030 | 230/790 |
| 12 | 1 ml (45) 1 ml (31) | 20 B | 5 | 13 | 14/60 | 450 | 75/220 |
| 16 | 0.5 g (45) 2.0 g (31) | 300 B | — | 60 | 48/50 | 520 | 114/347 |
| 13 | 1 ml (45) 1 ml (27) | 20 B | 5 | 15 | 14/60 | 550 | 47/204 |
| 14 | 0.5 ml (45) 0.5 ml (27) | 10 B | 5 | 20 | 14/50 | 450 | 40/115 |
| 9 | 0.25 g (46) 0.25 g (1) | 20 E | 5 | 10 | 24/25 | 180 | 550/1860 |
| 17 | 0.5 g (46) 0.5 g (1) | 15 E | 5 | 30 | 14/25 | 490 | 310/730 |
| 15 | 0.75 g (46) 0.73 (1) | 10 E | 10 | 30 | 14/25 | 150 | 535/1190 |

S: solvent = toluene [ml]
Light: exposure time 25° C. [min]
Standing time: before working up [h]/temperature [° C.]
MW: molecular weight (GPC, g/mol) [$M_n(k)/M_w(k)$]

EXAMPLE A18

20 mg of catalyst B are introduced into 1 ml of comonomer b and the mixture is irradiated for 1 min. A gelatinous solid is formed. Then a mixture of 2 ml of monomer 1 and 1 ml of comonomer b is added and the mixture is irradiated for 14 min. The reaction mixture is stirred at room temperature for 2 days and the copolymer formed is precipitated by adding methanol. It is dried at room temperature under a high vacuum for 24 h. By means of $^1$H-NMR, the composition of the copolymer reveals a ratio of poly-1 units to poly-b units of 10:1 $M_n$=81 k; $M_w$=371 k.

What is claimed is:

1. Composition comprising at least one nonvolatile acetylene of the formula I

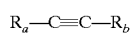  (I), in which $R_a$ is $C_1$–$C_{20}$alkyl which is unsubstituted or substituted by halogen, —OH, —CN, —$NH_2$, —NH($C_1$–$C_6$alkyl), —N($C_1$–$C_6$alkyl)$_2$, $C_1$–$C_6$alkyl, $C_1$–$C_6$alkyl—O—, $C_1$–$C_6$alkyl—S—, $C_1$–$C_6$alkyl—C(O)O—, $C_1$–$C_6$alkyl—OC(O)—, —C(O)—$NH_2$, $C_1$–$C_6$alkyl—C(O)NH— or $C_1$–$C_6$alkyl—NHC(O)—, or is $C_3$–$C_{12}$cycloalkyl, ($C_3$–$C_{12}$cycloalkyl)—$C_1$–$C_{12}$alkyl, $C_6$–$C_{18}$aryl, $C_7$–$C_{19}$aralkyl, $C_1$–$C_{20}$alkoxy, $C_3$–$C_{12}$-cycloalkoxy, ($C_3$–$C_{12}$cycloalkyl)—$C_1$–$C_{12}$alkoxy, $C_6$–$C_{18}$aryloxy, $C_7$–$C_{19}$aralkyloxy, $C_3$–$C_9$heterocycloalkyl having 1 to 3 heteroatoms selected from the group consisting of O, N and S, or $C_3$–$C_{15}$heteroaryl having 1 to 3 heteroatoms selected from the group consisting of O, N and S, or $R_a$ is —(O)$_k$—$SiR_cR_dR_e$, $C_1$–$C_{18}$alkyl—OC(O)—, —C(O)—$NH_2$ or $C_1$–$C_{18}$alkyl—NHC(O)—;

$R_b$ is hydrogen or, independently, has the meaning of $R_a$;

$R_c$, $R_d$ and $R_e$ independently of one another are $C_1$–$C_{18}$alkyl, $C_1$–$C_{18}$alkoxy, $C_5$- or $C_6$cycloalkyl, $C_5$- or $C_6$cycloalkoxy or unsubstituted or $C_1$–$C_6$alkyl- or $C_1$–$C_6$alkoxy-substituted phenyl, phenyloxy, benzyl or benzyloxy;

and k is 0 or 1;

alone or together with a strained cycloolefin and catalytic amounts of a catalyst for metathesis polymerization, wherein it comprises at least one one-component catalyst from the group of molybdenum compounds, tungsten compounds, niobium compounds and tantalum compounds which comprise (a) either at least two methyl groups or two monosubstituted methyl groups without α hydrogen atoms in the substituent or (b) at least one halogen and only one silylmethyl group attached to the metal.

2. Composition according to claim 1, wherein the substituents for $R_a$ and $R_b$ are selected from the group consisting of —OH, —F, —Cl, —CN, $C_1$–$C_4$alkyl and $C_1$–$C_4$alkoxy.

3. Composition according to claim 1, wherein $R_a$ and $R_b$ as alkyl contain 1 to 12 C atoms.

4. Composition according to claim 1, wherein the alkyl is branched.

5. Composition according to claim 1, wherein $R_a$ and $R_b$ as cycloalkyl are $C_5$–$C_8$cycloalkyl.

6. Composition according to claim 1, wherein $R_a$ and $R_b$ as cycloalkylalkyl are $C_5$–$C_8$cycloalkyl—$Ch_2$—, $C_5$–$C_8$cycloalkyl—CH($CH_3$)— or $C_5$–$C_8$cycloalkyl—C($CH_3$)$_2$—.

7. Composition according to claim 1, wherein $R_a$ and $R_b$ as aryl contain 6 to 14 C atoms.

8. Composition according to claim 1, wherein $R_a$ and $R_b$ as aralkyl contain 7 to 12 C atoms.

9. Composition according to claim 1, wherein $R_a$ and $R_b$ as heterocycloalkyl contain 4 or 5 C atoms and one or two heteroatoms selected from the group consisting of O, S and N.

10. Composition according to claim 1, wherein $R_a$ and $R_b$ as heteroaryl contain 4 or 5 C atoms and one or two heteroatoms selected from the group consisting of O, S and N.

11. Composition according to claim 1, wherein $R_c$, $R_d$ and $R_e$ as alkyl or alkoxy are linear or branched and contain 1 to 12 C atoms.

12. Composition according to claim 1, wherein $R_c$, $R_d$ and $R_e$ are $C_1$–$C_4$alkyl, $C_1$–$C_4$alkoxy, phenyl or benzyl.

13. Composition according to claim 1, wherein the formula —(O)$_k$—SiR$_c$R$_d$R$_e$ k is 0.

14. Composition according to claim 1, wherein $R_a$ is —Si(CH$_3$)$_3$, —Si(OC$_6$H$_5$)$_3$, —Si(CH$_2$—C$_6$H$_5$)$_3$, —Si(CH$_3$)$_2$(C$_2$H$_5$), —Si(C$_6$H$_5$)(CH$_3$)$_2$, —Si(OCH$_2$—C$_6$H$_5$)$_3$, —Si(CH$_3$)$_2$[C(CH$_3$)$_2$CH(CH$_3$)$_2$], —Si(n—C$_3$H$_7$)$_3$, —Si(n—C$_4$H$_9$)$_3$, —Si(CH$_3$)$_2$(n—C$_{12}$H$_{25}$), —Si(CH$_3$)$_2$(n—C$_4$H$_9$), —Si(CH$_3$)$_2$(t—C$_4$H$_9$), —Si(CH$_3$)$_2$(n—C$_{18}$H$_{37}$), —Si(CH$_2$—C$_6$H$_5$)(CH$_3$)$_2$, —Si(C$_2$H$_5$)$_3$, —Si(C$_6$H$_5$)$_3$ or —Si(OCH$_3$)$_3$.

15. Composition according to claim 14, wherein $R_a$ is —Si(CH$_3$)$_3$.

16. Composition according to claim 1, wherein one of the groups $R_a$ and $R_b$ is a sterically bulky group.

17. Composition according to claim 1, wherein the acetylene is CH$_3$—C≡CH, CH$_3$—C≡C—CH$_3$, C$_2$H$_5$—C≡CH, n— or i—C$_3$H$_7$—C≡CH, n—, i— or t—C$_4$H$_9$—C≡CH, t—C$_4$H$_9$—C≡C—CH$_3$, C$_4$H$_9$—C≡C—C$_4$H$_9$, C$_6$H$_{11}$—C≡CH, C$_6$H$_5$—C≡CH, C$_6$H$_5$C≡CC$_6$H$_5$, HC≡C—Si(CH$_3$)$_3$, (H$_3$C)$_3$Si—C≡C—Si(CH$_3$)$_3$, CH$_3$—C≡C—Si(CH$_3$)$_3$, t—C$_4$H$_9$O—C≡CH or HC≡C—Si(OCH$_3$)$_3$.

18. Composition according to claim 17, wherein the acetylene is t-butylacetylene, trimethylsilylacetylene or methyl-trimethylsilylacetylene.

19. Composition according to claim 1, wherein it additionally comprises a nonvolatile strained cycloolefin as comonomer.

20. Composition according to claim 19, wherein the amount of comonomer is from 0.1 to 99% by weight, based on the overall amount of the monomers.

21. Composition according to claim 19, wherein the amount of comonomer is from 1 to 95% by weight.

22. Composition according to claim 19, wherein the amount of comonomer is from 5 to 90% by weight.

23. Composition according to claim 19, wherein the amount of comonomer is from 5 to 75% by weight.

24. Composition according to claim 19, wherein the amount of comonomer is from 5 to 60% by weight.

25. Composition according to claim 19, wherein the cyclic olefin is a monocyclic or polycyclic fused, and/or bridged ring system and/or ring system connected directly or via a bridge group and having from two to four rings, which are unsubstituted or substituted and contain heteroatoms selected from the group consisting of O, S, N or Si in one or more rings and/or fused aromatic or heteroaromatic rings.

26. Composition according to claim 25, wherein the individual cycloolefins contain 3 to 16 ring members.

27. Composition according to claim 25, wherein the individual cycloolefins contain 3 to 12 ring members.

28. Composition according to claim 25, wherein the individual cycloolefins contain 3 to 8 ring members.

29. Composition according to claim 19, wherein the cycloolefin corresponds to the formula II

in which $Q_1$ is a radical which has at least one carbon atom and which, together with the —CH═CQ$_2$— group, forms an at least 3-membered alicyclic ring which optionally contains one or more heteroatoms selected from the group consisting of silicon, phosphorus, oxygen, nitrogen and sulfur; and which is unsubstituted or is substituted by halogen, ═O, —CN, —NO$_2$, R$_1$R$_2$R$_3$Si—(O)$_u$—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, $C_1$–$C_{20}$alkyl, $C_1$–$C_{20}$hydroxyalkyl, $C_1$–$C_{20}$haloalkyl, $C_1$–$C_6$cyanoalkyl, $C_3$–$C_8$cycloalkyl, $C_6$–$C_{16}$aryl, $C_7$–$C_{16}$aralkyl, $C_3$–$C_6$heterocycloalkyl, $C_3$–$C_{16}$heteroaryl, $C_4$–$C_{16}$heteroaralkyl or R$_4$—X—; or in which two adjacent C atoms are substituted by —CO—O—CO— or —CO—NR$_5$—CO—; or in which an alicyclic, aromatic or heteroaromatic ring is fused onto adjacent carbon atoms of the alicyclic ring and is unsubstituted or substituted by halogen, —CN, —NO$_2$, R$_6$R$_7$R$_8$Si—(O)$_u$—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, $C_1$–$C_{20}$alkyl, $C_1$–$C_{20}$haloalkyl, $C_1$–$C_{20}$hydroxyalkyl, $C_1$–$C_6$cyanoalkyl, $C_3$–$C_8$cycloalkyl, $C_6$–$C_{16}$aryl, $C_7$–$C_{16}$aralkyl, $C_3$–$C_6$heterocycloalkyl, $C_3$–$C_{16}$heteroaryl, $C_4$–$C_{16}$heteroaralkyl or R$_{13}$—X$_1$—;

X and X$_1$ independently of one another are —O—, —S—, —CO—, —SO—, —SO$_2$—, —O—C(O)—, —C(O)—O—, —C(O)—NR$_5$—, —NR$_{10}$—C(O)—, —SO$_2$—O— or —O—SO$_2$—;

R$_1$, R$_2$ and R$_3$ independently of one another are $C_1$–$C_{12}$alkyl, $C_1$–$C_{12}$perfluoroalkyl, phenyl or benzyl;

R$_4$ and R$_{13}$ independently are $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl or $C_7$–$C_{16}$aralkyl;

R$_5$ and R$_{10}$ independently of one another are hydrogen, $C_1$–$C_{12}$alkyl, phenyl or benzyl, the alkyl groups in turn being unsubstituted or substituted by $C_1$–$C_{12}$alkoxy or $C_3$–$C_8$cycloalkyl;

R$_6$, R$_7$ and R$_8$ independently of one another are $C_1$–$C_{12}$alkyl, $C_1$–$C_{12}$perfluoroalkyl, phenyl or benzyl;

M is an alkali metal and M$_1$ is an alkaline earth metal; and u is 0 or 1;

where the alicyclic ring formed with Q$_1$ may contain further nonaromatic double bonds;

Q$_2$ is hydrogen, $C_1$–$C_{20}$alkyl, $C_1$–$C_{20}$haloalkyl, $C_1$–$C_{12}$alkoxy, halogen, —CN, R$_{11}$—X$_2$—;

R$_{11}$ is $C_1$–$C_{20}$alkyl, $C_1$–$C_{20}$haloalkyl, $C_1$–$C_{20}$hydroxyalkyl, $C_3$–$C_8$cycloalkyl, $C_6$–$C_{16}$aryl or $C_7$–$C_{16}$aralkyl;

X$_2$ is —C(O)—O— or —C(O)—NR$_{12}$—;

R$_{12}$ is hydrogen, $C_1$–$C_{12}$alkyl, phenyl or benzyl;

where the above-mentioned cycloalkyl, heterocycloalkyl, aryl, heteroaryl, aralkyl and heteroaralkyl groups are unsubstituted or substituted by $C_1$–$C_{12}$alkyl, $C_1$–$C_{12}$alkoxy, —NO$_2$, —CN or halogen, and where the heteroatoms of the above-mentioned heterocycloalkyl, heteroaryl and heteroaralkyl groups are selected from the group —O—, —S—, —NR$_9$— and —N=; and R$_9$ is hydrogen, C$_1$–C$_{12}$alkyl, phenyl or benzyl.

30. Composition according to claim 29, wherein the cycloolefins of the formula II Q$_1$ is a radical having at least one carbon atom which together with the —CH=CQ$_2$— group forms a 3- to 20-membered alicyclic ring which may contain one or more heteroatoms selected from the group consisting of silicon, oxygen, nitrogen and sulfur, and which is unsubstituted or substituted by halogen, =O, —CN, —NO$_2$, R$_1$R$_2$R$_3$Si—(O)$_u$—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, C$_1$–C$_{12}$alkyl, C$_1$–C$_{12}$haloalkyl, C$_1$–C$_{12}$hydroxyalkyl, C$_1$–C$_4$cyanoalkyl, C$_3$–C$_6$cycloalkyl, C$_6$–C$_{12}$aryl, C$_7$–C$_{12}$aralkyl, C$_3$–C$_6$heterocycloalkyl, C$_3$–C$_{12}$heteroaryl, C$_4$–C$_{12}$heteroaralkyl or R$_4$—X—; or in which two adjacent C atoms in this radical Q$_1$ are substituted by —CO—O—CO— or —CO—NR$_5$—CO—; or in which an alicyclic, aromatic or heteroaromatic ring may be fused onto adjacent carbon atoms and is unsubstituted or substituted by halogen, —CN, —NO$_2$, R$_6$R$_7$R$_8$Si—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, C$_1$–C$_{12}$alkyl, C$_1$–C$_{12}$haloalkyl, C$_1$–C$_{12}$hydroxyalkyl, C$_1$–C$_4$cyanoalkyl, C$_3$–C$_6$cycloalkyl, C$_6$–C$_{12}$aryl, C$_7$–C$_{12}$aralkyl, C$_3$–C$_6$heterocycloalkyl, C$_3$–C$_{12}$heteroaryl, C$_4$–C$_{12}$heteroaralkyl or R$_{13}$—X$_1$—;

X and X$_1$ independently of one another are —O—, —S—, —CO—, —SO—, —SO$_2$—, —O—C(O)—, —C(O)—O—, —C(O)—NR$_5$—, —NR$_{10}$—C(O)—, —SO$_2$—O— or —O—SO$_2$—;

R$_1$, R$_2$ and R$_3$ independently of one another are C$_1$–C$_6$alkyl, C$_1$–C$_6$perfluoroalkyl, phenyl or benzyl;

M is an alkali metal and M$_1$ is an alkaline earth metal;

R$_4$ and R$_{13}$ independently of one another are C$_1$–C$_{12}$alkyl, C$_1$–C$_{12}$haloalkyl, C$_1$–C$_{12}$hydroxyalkyl, C$_3$–C$_8$cycloalkyl, C$_6$–C$_{12}$aryl or C$_7$–C$_{12}$aralkyl;

R$_5$ and R$_{10}$ independently of one another are hydrogen, C$_1$–C$_6$alkyl, phenyl or benzyl, the alkyl groups in turn being unsubstituted or substituted by C$_1$–C$_6$alkoxy or C$_3$–C$_6$cycloalkyl;

R$_6$, R$_7$ and R$_8$ independently of one another are C$_1$–C$_6$alkyl, C$_1$–C$_6$perfluoroalkyl, phenyl or benzyl;

u is 0 or 1;

where the alicyclic ring formed with Q$_1$ may contain further nonaromatic double bonds;

Q$_2$ is hydrogen, C$_1$–C$_{12}$alkyl, C$_1$–C$_{12}$haloalkyl, C$_1$–C$_6$alkoxy, halogen, —CN, R$_{11}$—X$_2$—;

R$_{11}$ is C$_1$–C$_{12}$alkyl, C$_1$–C$_{12}$haloalkyl, C$_1$–C$_{12}$hydroxyalkyl, C$_3$–C$_6$cycloalkyl, C$_6$–C$_{12}$aryl or C$_7$–C$_{12}$aralkyl;

X$_2$ is —C(O)—O— or —C(O)—NR$_{12}$—; and

R$_{12}$ is hydrogen, C$_1$–C$_6$alkyl, phenyl or benzyl;

where the cycloalkyl, heterocycloalkyl, aryl, heteroaryl, aralkyl and heteroaralkyl groups are unsubstituted or substituted by C$_1$–C$_6$alkyl, C$_1$–C$_6$alkoxy, —NO$_2$, —CN or halogen, and where the heteroatoms of the heterocycloalkyl, heteroaryl and heteroaralkyl groups are selected from the group consisting of —O—, —S—, —NR$_9$— and —N=; and R$_9$ is hydrogen, C$_1$–C$_6$alkyl, phenyl or benzyl.

31. Composition according to claim 29, wherein the cycloolefins of the formula II Q$_1$ is a radical having at least one carbon atom which together with the —CH=CQ$_2$— group forms a 3- to 10-membered alicyclic ring which may contain a heteroatom selected from the group consisting of silicon, oxygen, nitrogen and sulfur and which is unsubstituted or substituted by halogen, —CN, —NO$_2$, R$_1$R$_2$R$_3$Si—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, C$_1$–C$_6$alkyl, C$_1$–C$_6$haloalkyl, C$_1$–C$_6$hydroxyalkyl, C$_1$–C$_4$cyanoalkyl, C$_3$–C$_6$cycloalkyl, phenyl, benzyl or R$_4$—X—; or in which an alicyclic, aromatic or heteroaromatic ring may be fused onto adjacent carbon atoms and is unsubstituted or substituted by halogen, —CN, —NO$_2$, R$_6$R$_7$R$_8$Si—, —COOM, —SO$_3$M, —PO$_3$M, —COO(M$_1$)$_{1/2}$, —SO$_3$(M$_1$)$_{1/2}$, —PO$_3$(M$_1$)$_{1/2}$, C$_1$–C$_6$alkyl, C$_1$–C$_6$haloalkyl, C$_1$–C$_6$hydroxyalkyl, C$_1$–C$_4$cyanoalkyl, C$_3$–C$_6$cycloalkyl, phenyl, benzyl or R$_{13}$—X$_1$—;

R$_1$, R$_2$ and R$_3$ independently of one another are C$_1$–C$_4$alkyl, C$_1$–C$_4$perfluoroalkyl, phenyl or benzyl;

M is an alkali metal and M$_1$ is an alkaline earth metal;

R$_4$ and R$_{13}$ independently of one another are C$_1$–C$_6$alkyl, C$_1$–C$_6$haloalkyl, C$_1$–C$_6$hydroxyalkyl or C$_3$–C$_6$cycloalkyl;

X and X$_1$ independently of one another are —O—, —S—, —CO—, —SO— or —SO$_2$—;

R$_6$, R$_7$ and R$_8$ independently of one another are C$_1$–C$_4$alkyl, C$_1$–C$_4$perfluoroalkyl, phenyl or benzyl;

and Q$_2$ is hydrogen.

32. Composition according to claim 29, wherein the compounds of the formula II are norbornene and norbornene derivatives.

33. Composition according to claim 19, wherein the strained cycloolefin is composed only of carbon and hydrogen.

34. Composition according to claim 19, wherein the comonomers are selected from the group consisting of norbornene, cyclopentene, cycloheptene and cyclooctene.

35. Composition according to claim 1, wherein the methyl group and the substituted methyl group corresponds to the formula VII $$-CH_2-R \qquad (VII),$$

in which

R is H, —CF$_3$, —CR$_{26}$R$_{27}$R$_{28}$, —SiR$_{29}$R$_{30}$R$_{31}$, unsubstituted or C$_1$–C$_6$alkyl- or C$_1$–C$_6$alkoxy-substituted C$_6$–C$_{16}$aryl or C$_4$–C$_{15}$heteroaryl having 1 to 3 heteroatoms selected from the group consisting of O, S and N; and R$_{26}$, R$_{27}$ and R$_{28}$ independently of one another are C$_1$–C$_{10}$alkyl which is unsubstituted or substituted by C$_1$–C$_{10}$alkoxy, or R$_{26}$ and R$_{27}$ have this meaning and R$_{28}$ is C$_6$–C$_{10}$aryl or C$_4$–C$_9$heteroaryl which is unsubstituted or substituted by C$_1$–C$_6$alkyl or C$_1$–C$_6$alkoxy; and R$_{29}$, R$_{30}$ and R$_{31}$ independently of one another are C$_1$–C$_{18}$alkyl, C$_5$- or C$_6$cycloalkyl, or unsubstitute or C$_1$–C$_6$alkyl- or C$_1$–C$_6$alkoxy-substituted phenyl or benzyl.

36. Composition according to claim 35, wherein the group R in formula VII is H, —C(CH$_3$)$_3$, —C(CH$_3$)$_2$C$_6$H$_5$, phenyl which is unsubstituted or is substituted by methyl, ethyl, methoxy or ethoxy, or is —CF$_3$ or —Si(CH$_3$)$_3$.

37. Composition according to claim 1, wherein the silylmethyl group corresponds to the formula VIIa —CH$_2$—SiR$_{29}$R$_{30}$R$_{31}$ (VIIa), in which R$_{29}$, R$_{30}$ and R$_{31}$ independently of one another are C$_1$–C$_{18}$alkyl, C$_5$- or C$_6$cycloalkyl, or are unsubstituted or C$_1$–C$_6$alkyl- or C$_1$–C$_6$alkoxy-substituted phenyl or benzyl.

38. Composition according to claim 37, where in the group of the formula VIIa R$_{29}$ to R$_{31}$ are C$_1$–C$_4$alkyl, phenyl or benzyl.

39. Composition according to claim 37, wherein the group of the formula VIIa consists of —CH$_2$Si(CH$_3$)$_3$, —CH$_2$—Si(C$_2$H$_5$)$_3$, —CH$_2$—Si(n-C$_3$H$_7$)$_3$, —CH$_2$—Si(n-C$_4$H$_9$)$_3$, —CH$_2$—Si(CH$_3$)$_2$(n-C$_4$H$_9$), —CH$_2$—Si(CH$_3$)$_2$(t-C$_4$H$_9$), —CH$_2$—Si(CH$_3$)$_2$(C$_2$H$_5$), —CH$_2$—Si(C$_6$H$_5$)$_3$, —CH$_2$—Si(CH$_3$)$_2$(C(CH$_3$)$_2$CH(CH$_3$)$_2$), —CH$_2$—Si(CH$_3$)$_2$(n-C$_{12}$H$_{25}$), —CH$_2$—Si(CH$_2$—C$_6$H$_5$)$_3$, —CH$_2$—Si(CH$_3$)$_2$(n-C$_{18}$H$_{37}$), —CH$_2$—Si(C$_6$H$_5$)(CH$_3$)$_2$ or —CH$_2$—Si(CH$_2$—C$_6$H$_5$)(CH$_3$)$_2$.

40. Composition according to claim 1, wherein the silylmethyl group is —CH$_2$—Si(CH$_3$)$_3$.

41. Composition according to claim 1, wherein remaining valences of the Mo(VI)-, W(VI)-, Nb(V)- and TA(V) atoms are satisfied by idential or different ligands selected from the group consisting of =O, =N—R$_{33}$, secondary amines having 2 to 18 C atoms, R$_{32}$O— or R$_{32}$S—, halogen, cyclopentadienyl or bridged biscyclopentadienyl, indenyl, bisphenolates, tridentate monoanionic ligands, and neutral ligands selected from the group consisting of ethers, nitriles, CO and tertiary phosphines and tertiary amines, in which R$_{32}$ independently of one another are unsubstituted or C$_1$–C$_6$alkoxy- or halo- substituted linear or branched C$_1$–C$_{18}$alkyl, unsubstituted or C$_1$–C$_6$alkyl-, C$_1$–C$_6$alkoxy- or halo-substituted C$_5$- or C$_6$cycloalkyl, unsubstituted or C$_1$–C$_6$alkyl-, C$_1$–C$_6$alkoxy-, C$_1$–C$_6$alkoxymethyl-, C$_1$–C$_6$alkoxyethyl- or halo-substituted phenyl, or unsubstituted or C$_1$–C$_6$alkyl-, C$_1$–C$_6$alkoxy-, C$_1$–C$_6$alkoxymethyl-, C$_1$–C$_6$alkoxyethyl- or halo-substituted benzyl or phenylethyl; and R$_{33}$ is unsubstituted or C$_1$–C$_6$alkoxy-substituted linear or branched C$_1$–C$_{18}$alkyl, unsubstituted or C$_1$–C$_6$alkyl-, C$_1$–C$_6$alkoxy- or halo-substituted C$_5$- or C$_6$cycloalkyl, phenyl which is unsubstituted or substituted by C$_1$–C$_6$alkyl, C$_1$–C$_6$alkoxy, C$_1$–C$_6$alkoxymethyl, C$_1$–C$_6$alkoxyethyl, di(C$_1$–C$_6$alkyl)amino, di(C$_1$–C$_6$alkyl)amino-C$_1$–C$_3$alkyl, or halogen, or is unsubstituted or C$_1$–C$_6$alkyl-, C$_1$–C$_6$alkoxy-, C$_1$–C$_6$alkoxymethyl-, C$_1$–C$_6$alkoxyethyl- or halo-substituted benzyl or phenylethyl.

42. Composition according to claim 41, wherein the molybdenum compounds, tungsten compounds, niobium compounds and tantalum compounds correspond to one of the formulae VIII to VIIId,

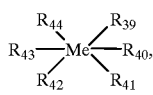
(VIII)

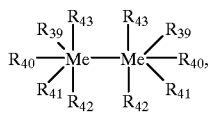
(VIIa)

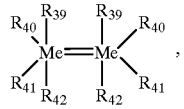
(VIIIb)

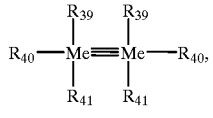
(VIIIc)

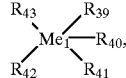
(VIIId)

in which

Me is Mo(VI) or W(VI),

Me$_1$ is Nb(V) or Ta(V), at least two of the radicals R$_{39}$ to R$_{43}$ are a radical —CH$_2$—R of the formula VII, R is H, —CF$_3$, —CR$_{26}$R$_{27}$R$_{28}$, —SiR$_{29}$R$_{30}$R$_{31}$, unsubstituted or C$_1$–C$_6$alkyl- or C$_1$–C$_6$alkoxy-substituted C$_6$–C$_{16}$aryl or C$_4$–C$_{15}$heteroaryl having 1 to 3 heteroatoms selected from the group consisting of O, S and N;

R$_{26}$, R$_{27}$ and R$_{28}$ independently of one another are C$_1$–C$_{10}$alkyl which is unsubstituted or substituted by C$_1$–C$_{10}$alkoxy, or R$_{28}$ can also be C$_6$–C$_{10}$aryl or C$_4$–C$_9$heteroaryl which is unsubstituted or substituted by C$_1$–C$_6$alkyl or C$_1$–C$_6$alkoxy; and R$_{29}$, R$_{30}$ and R$_{31}$ independently of one another are C$_1$–C$_{18}$alkyl, C$_5$- or C$_6$cycloalkyl, or are unsubstituted or C$_1$–C$_6$alkyl- or C$_1$–C$_6$alkoxy-substituted phenyl or benzyl;

pairs of the remaining radicals from R$_{39}$ to R$_{43}$ are =O or =N—R$_{33}$, and R$_{33}$ is linear or branched C$_1$–C$_{18}$alkyl which is unsubstituted or substituted by C$_1$–C$_6$alkoxy, or is C$_5$- or C$_6$cycloalkyl which is unsubstituted or substituted by C$_1$–C$_6$alkyl, C$_1$–C$_6$alkoxy or halogen, or is phenyl which is unsubstituted or substituted by C$_1$–C$_6$alkyl, C$_1$–C$_6$alkoxy, C$_1$–C$_6$alkoxymethyl, C$_1$–C$_6$alkoxyethyl, di(C$_1$–C$_6$alkyl)amino, di(C$_1$–C$_6$alkyl)amino-C$_1$–C$_3$alkyl or halogen, or is phenylethyl or benzyl which is unsubstituted or substituted by C$_1$–C$_6$alkyl, C$_1$–C$_6$alkoxy, C$_1$–C$_6$alkoxymethyl, C$_1$–C$_6$alkoxyethyl, di(C$_1$–C$_6$alkyl)amino, di(C$_1$–C$_6$alkyl)amino-C$_1$–C$_3$alkyl or halogen; and/or the remaining radicals from R$_{39}$ to R$_{43}$ are secondary amino having 2 to 18 C atoms, R$_{32}$O— or R$_{32}$S—, halogen, indenyl, cyclopentadienyl or bridged biscyclopentadienyl or a neutral ligand, in which R$_{32}$ independently of one another are linear or branched C$_1$–C$_{18}$alkyl which is unsubstituted or substituted by C$_1$–C$_6$alkoxy or halogen, or are C$_5$- or C$_6$cycloalkyl which is unsubstituted or substituted by C$_1$–C$_6$alkyl, C$_1$–C$_6$alkoxy or halogen, or are phenyl which is unsubstituted or substituted by C$_1$–C$_6$alkyl, C$_1$–C$_6$alkoxy, C$_1$–C$_6$alkoxymethyl, C$_1$–C$_6$alkoxyethyl, di(C$_1$–C$_6$alkyl)amino, di(C$_1$–C$_6$alkyl)amino-C$_1$–C$_3$alkyl or halogen, or are phenylethyl or benzyl which is unsubstituted or substituted by C$_1$–C$_6$alkyl, C$_1$–C$_6$alkoxy, C$_1$–C$_6$alkoxymethyl, C$_1$–C$_6$alkoxyethyl, di(C$_1$–C$_6$alkyl)amino, di(C$_1$–C$_6$alkyl)amino-C$_1$–C$_3$alkyl or halogen.

43. Composition according to claim 42, wherein the molybdenum compounds and tungsten compounds correspond to the formula VIII in which a) $R_{39}$ to $R_{44}$ are a radical of the formula VII —$CH_2$—R, or b) $R_{39}$ to $R_{40}$ are a radical of the formula VII —$CH_2$—R, $R_{41}$ and $R_{42}$ together are the radical =N—$R_{33}$, and $R_{43}$ and $R_{44}$ together, independently of one another, are $R_{32}$—O— or halogen, or c) $R_{43}$ and $R_{44}$ together and $R_{41}$ and $R_{42}$ together are the radical =N—$R_{33}$, and $R_{39}$ and $R_{40}$ are a radical of the formula VII —$CH_2$—R; wherein the —$CH_2$—R is defined as in claim 35.

44. Composition according to claim 42, wherein the molybdenum compounds and tungsten compounds correspond to the formula IX, IXa or IXb

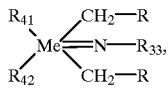  (IX)

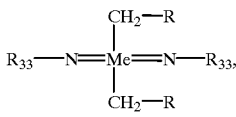  (IXa)

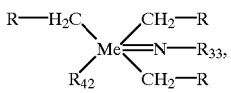  (IXb)

in which

Me is Mo(VI) or W(VI),

R is H, —$C(CH_3)_3$, —$C(CH_3)_2$—$C_6H_5$, —$C_6H_5$ or —Si$(C_1$–$C_4$alkyl$)_3$, $R_{33}$ is phenyl or phenyl substituted from 1 to 3 times by $C_1$–$C_4$alkyl or $C_1$–$C_4$alkoxy, $R_{41}$ is unsubstituted or fluorine-substituted, linear or branched $C_1$–$C_4$alkoxy, and $R_{42}$ has the same meaning as $R_{41}$ or is F, Cl or Br.

45. Composition according to claim 42, which comprises niobium compounds or tantalum compounds of the formula VIIId in which a) $R_{39}$ to $R_{43}$ are a radical of the formula VII —$CH_2$—R, or b) $R_{39}$ to $R_{40}$ are a radical of the formula VII —$CH_2$—R, $R_{41}$ and $R_{42}$ together are the radical =N—$R_{33}$, and $R_{43}$ is unsubstituted or substituted cyclopentadienyl, indenyl, $R_{32}$—O— or halogen, or c) $R_{39}$, $R_{40}$ and $R_{41}$ are a radical of the formula VII —$CH_2$—R, and $R_{42}$ and $R_{43}$ together are the radical =N—$R_{33}$, or $R_{39}$, $R_{40}$, $R_{41}$ and $R_{42}$ are a radical of the formula VII —$CH_2$—R, and $R_{43}$ is unsubstituted or substituted cyclopentadienyl or indenyl, $R_{32}$—O— or halogen; wherein —$CH_2$—R is defined as in claim 35.

46. Composition according to claim 42, which comprises niobium compounds or tantalum compounds of the formula IXc, IXd and IXe

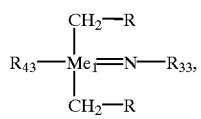  (IXc)

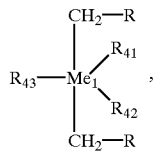  (IXd)

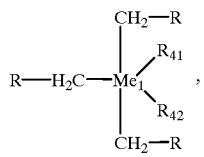  (IXe)

in which $Me_1$ is Nb(V) or TA(V),

R is H, —$C(CH_3)_3$, —$C(CH_3)_2$—$C_6H_5$, —$C_6H_5$ or —Si$(C_1$–$C_4$alkyl$)_3$, $R_{33}$ is phenyl or phenyl substituted from 1 to 3 times by $C_1$–$C_4$alkyl or $C_1$–$C_4$alkoxy, $R_{43}$ in formula IXc is the group —$CH_2$—R as defined in claim 35 F, Cl, Br, unsubstituted or fluorine-substituted, linear or branched $C_1$–$C_4$alkoxy, unsubstituted or $C_1$–$C_4$alkyl- or $C_1$–$C_4$alkoxy-substituted phenyloxy or unsubstituted or $C_1$–$C_4$alkyl-substituted cyclopentadienyl or indenyl;

$R_{41}$, $R_{42}$ and $R_{43}$ in formula IXd independently of one another are F, Cl, Br, unsubstituted or fluorine-substituted linear or—in particular—branched $C_1$–$C_4$alkoxy, unsubstituted or $C_1$–$C_4$alkyl- or $C_1$–$C_4$alkoxy-substituted phenyloxy or unsubstituded or $C_1$–$C_4$alkyl-substituted cyclopentadienyl or indenyl; and $R_{41}$ and $R_{42}$ in formula IXe independently of one another are F, Cl, Br, unsubstituted or fluorine-substituted linear or branched $C_1$–$C_4$alkoxy, unsubstituted or $C_1$–$C_4$alkyl- or $C_1$–$C_4$alkoxy-substituted phenyloxy or unsubstituted or $C_1$–$C_4$alkyl-substituted cyclopentadienyl or indenyl.

47. Composition according to claim 1, which comprises niobium compounds, tantalum compounds, molybdenum compounds or tungsten compounds of the formula X or Xa

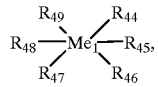  (X)

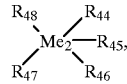  (Xa)

in which $Me_1$ is Mo(VI) or W(VI);

$Me_2$ is Nb(V) or Ta(V);

one of the radicals $R_{44}$ to $R_{49}$ is a radical —$CH_2$—Si$R_{29}R_{30}R_{31}$ of the formula VIIa as defined in claim 37;

at least one of the radicals $R_{44}$ to $R_{49}$ is F, Cl or Br;

$R_{29}$, $R_{30}$ and $R_{31}$ independently of one another are $C_1$–$C_6$alkyl, $C_5$- or $C_6$cycloalkyl, or unsubstituted or $C_1$–$C_6$alkyl- or $C_1$–$C_6$alkoxy-substituted phenyl or benzyl;

in formula X two or pairs, and in formula Xa two, of the remaining radicals from $R_{44}$ to $R_{49}$, in each case together, are =O or =N—$R_{33}$, and $R_{33}$ is linear or branched $C_1$–$C_{18}$alkyl which is unsubstituted or substituted by $C_1$–$C_6$alkoxy, or is $C_5$- or $C_6$cycloalkyl which is unsubstituted or substituted by $C_1$–$C_6$alkyl, $C_1$–$C_6$alkoxy or halogen, or is phenyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl or halogen, or is phenylethyl or benzyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl or halogen, and the remaining radicals $R_{44}$ to $R_{48}$ are secondary amino having 2 to 18 C atoms, $R_{32}$O— or $R_{32}$S—, halogen, unsubstituted or substituted cyclopentadienyl, indenyl or bridged biscyclopentadienyl or a neutral ligand in which $R_{32}$ independently of one another are linear or branched $C_1$–$C_{18}$alkyl which is unsubstituted or substituted by $C_1$–$C_6$alkoxy or halogen, or are $C_5$- or $C_6$cycloalkyl which is unsubstituted or substituted by $C_1$–$C_6$alkyl, $C_1$–$C_6$alkoxy or halogen, or are phenyl which is unsubstituted or substituted by $C_1$–$C_6$alkyl, $C_1$–$C_6$alkoxy, $C_1$–$C_6$alkoxy-methyl, $C_1$–$C_6$alkoxyethyl, di($C_1$–$C_6$alkyl)amino, di($C_1$–$C_6$alkyl)amino-$C_1$–$C_3$alkyl or halogen, or are phenylethyl or benzyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl or halogen; or in the formulae X and Xa the remaining radicals of $R_{44}$ to $R_{49}$ independently of one another are secondary amino having 2 to 18 C atoms, $R_{32}$O— or $R_{32}$S—, halogen, unsubstituted or substituted cyclopentadienyl, indenyl or bridged biscyclopentadienyl or a neutral ligand, in which the $R_{32}$S independently of one another are linear or branched $C_1$–$C_{18}$alkyl which is unsubstituted or substituted by $C_1$–$C_6$alkoxy or halogen, or are $C_5$- or $C_6$cycloalkyl which is unsubstituted or substituted by $C_1$–$C_6$alkyl, $C_1$–$C_6$alkoxy or halogen, or are phenyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl or halogen, or are phenylethyl or benzyl which is unsubstituted or substituted by $C_1$–$C_6$alkyl, $C_1$–$C_6$alkoxy, $C_1$–$C_6$alkoxymethyl, $C_1$–$C_6$alkoxyethyl, di($C_1$–$C_6$alkyl)amino, di($C_1$–$C_6$alkyl)amino-$C_1$–$C_3$alkyl or halogen.

48. Composition according to claim 47, which comprises niobium compounds, tantalum compounds, molybdenum compounds or tungsten compounds of the formula X or Xa in which $R_{44}$ is a radical of the formula VIIa —$CH_2$–Si($R_{29}R_{30}R_{31}$)$_3$ and $R_{45}$ is F, Cl or Br; and (a) in formula X $R_{46}$ and $R_{47}$ and also $R_{48}$ and $R_{49}$, in each case together, are the radical =N—$R_{33}$, or $R_{46}$ and $R_{47}$ together are the radical =N—$R_{33}$, and $R_{48}$ and $R_{49}$ independently of one another are unsubstituted or substituted cyclopentadienyl, indenyl, $R_{32}$—O— or halogen, or b) in formula Xa $R_{46}$ and $R_{47}$ together are the radical =N—$R_{33}$, and $R_{48}$ are unsubstituted or substituted cyclopentadienyl, indenyl, $R_{32}$—O— or halogen, or in formula Xa $R_{46}$, $R_{47}$ and $R_{48}$ independently of one another are unsubstituted or substituted cyclopentadienyl, indenyl, $R_{32}$—O— or halogen.

49. Composition according to claim 47, which comprises niobium compounds, tantalum compounds, molybdenum compounds or tungsten compounds of the formula XI, XIa, XIb or XIc

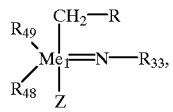

(XI)

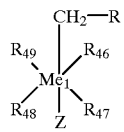

(XIa)

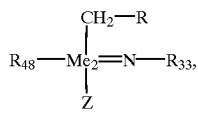

(XIb)

(XIc)

in which $Me_1$ is Mo(VI) or W(VI);

$Me_2$ is Nb(V) or Ta(V);

R is —Si($C_1$–$C_4$alkyl)$_3$;

Z is F, Cl or Br;

$R_{33}$ is phenyl or phenyl which is substituted from 1 to 3 times by $C_1$–$C_4$alkyl or $C_1$–$C_4$alkoxy, (a) $R_{48}$ and $R_{49}$ in formula XI together are the group =$NR_{33}$ or individually, independently of one another, are F, Cl, Br, unsubstituted or fluorine-substituted linear or—in particular—branched $C_1$–$C_4$alkoxy, unsubstituted or $C_1$–$C_4$alkyl- or $C_1$–$C_4$alkoxy-substituted phenyloxy or $R_{41}$, $R_{42}$, $R_{43}$ and $R_{44}$ unsubstituted or $C_1$–$C_4$alkyl-substituted cyclopentadienyl;

(b) $R_{46}$, $R_{47}$, $R_{48}$ and $R_{49}$ in formula XIa independently of one another are F, Cl Br, unsubstituted or fluorine-substituted, linear or—in particular—branched $C_1$–$C_4$alkoxy, unsubstituted or $C_1$–$C_4$alkyl- or $C_1$–$C_4$alkoxy-substituted phenyloxy or unsubstituted or $C_1$–$C_4$alkyl-substituted cyclopentadienyl or indenyl;

(c) $R_{48}$ in formula XIb is F, Cl Br, unsubstituted or fluorine-substituted, linear or—in particular—branched $C_1C_4$alkoxy, unsubstituted or $C_1$–$C_4$alkyl- or $C_1$–$C_4$alkoxy-substituted phenyloxy or unsubstituted or $C_1$–$C_4$alkyl-substituted cyclopentadienyl or indenyl; and (d) $R_{46}$, $R_{47}$ and $R_{48}$ in formula XIc independently of one another are F, Cl, Br, unsubstituted or fluorine-substituted, linear or—in particular—branched $C_1$–$C_4$alkoxy, unsubstituted or $C_1$–$C_4$alkyl- or $C_1$–$C_4$alkoxy-substituted phenyloxy or unsubstituted or $C_1$–$C_4$alkyl-substituted cyclopentadienyl or indenyl.

50. Composition according to claim 47, which comprises compounds of the formula XII, XIIA, XIIb or XIIc $$(R_{33}\!\!-\!\!N\!\!=\!\!)_2Me_1X_aCH_2Si(CH_3)_3 \quad (XII),$$

$$(R_{33}\!\!-\!\!N\!\!=\!\!)R_{46}Me_1X_a(OR_{32})CH_2Si(CH_3)_3(XIIa),$$

$$R_{46}R_{47}Me_2X_a(OR_{32})CH_2Si(CH_3)_3 \quad (XIIb),$$

$$R_{33}\!\!-\!\!N\!\!=\!\!Me_2X_a(OR_{32})CH_2Si(CH_3)_3 \quad (XIIc),$$

in which $Me_1$ is Mo(VI) or W(VI);

$Me_2$ is Nb(V) or Ta(V); and $X_a$ is F, Cl or Br;

$R_{32}$ is branched, optionally partially or completely fluorine-substituted $C_3$- or $C_4$alkyl or phenyloxy or phenyloxy substituted from 1 to 3 times by methyl or ethyl groups;

$R_{33}$ is phenyl or phenyl substituted by 1 to 2 $C_1$–$C_4$alkyl groups;

$R_{46}$ and $R_{47}$ independently of one another are cyclopentadienyl which is unsubstituted or substituted by 1 to 5 methyl groups or are indenyl, $X_a$ or $R_{32}O$—; and $R_{48}$ is cyclopentadienyl which is unsubstituted or substituted by 1 to 5 methyl groups or is $X_a$ or $R_{32}O$—.

51. Composition according to claim 1, which comprises the one-component catalyst in an amount of from 0.001 to 20 mol-%, based on the amount of the monomers.

52. Composition according to claim 51, which comprises the one-component catalyst in an amount of from 0.01 to 15 mol-%.

53. Composition according to claim 51, which comprises the one-component catalyst in an amount of from 0.01% to 10 mol-%.

54. Composition according to claim 51, which comprises the one-component catalyst in an amount of from 0.01 to 5 mol-%.

55. Composition according to claim 1, which comprises formulation auxiliaries.

56. Process for preparing polymers from acetylenes by photometathesis polymerization, which comprises at least one nonvolatile acetylene alone or together with a strained cycloolefin and catalytic amounts of at least one one-component catalyst selected from the group consisting of molybdenum compounds, tungsten compounds, niobium compounds and tantalum compounds, which either comprise at least two methyl groups or two monosubstituted methyl groups without α hydrogen atoms in the substituent or comprise at least one halogen and only one silymethyl group attached to the metal,
   (a) is polymerized by irradiation, or
   (b) the one-component catalyst is activated by brief irradiation and the
   polymerization is brought to an end by heating at temperatures from 30 to 300° C.

57. Process for preparing coated materials or relief images on carrier materials, wherein a composition according to claim 1 with or without solvent is applied as a layer to a carrier, the solvent (if used) is removed, and the layer is irradiated to polymerize it, or the layer is irradiated through a photomask, is subjected if desired to thermal aftercuring following the irradiation, and then the nonirradiated areas are removed with a solvent.

58. Coated carrier material, wherein layer of a composition according to claim 1 has been applied to the carrier material.

59. Carrier material, wherein a polymerized layer of a composition according to claim 1 has been applied to the carrier material.

60. A shaped article comprising a polymer of the composition according to claim 1.

* * * * *